United States Patent
Vanapalli et al.

(10) Patent No.: US 12,529,693 B2
(45) Date of Patent: Jan. 20, 2026

(54) AUTOMATED MICROFLUIDIC SYSTEM FOR LIFESPAN AND HEALTHSPAN ANALYSIS IN NEMATODES

(71) Applicant: Texas Tech University System, Lubbock, TX (US)

(72) Inventors: Siva A. Vanapalli, Lubbock, TX (US); Taslim Anupom, Lubbock, TX (US); Mizanur Rahman, Lubbock, TX (US); Siddhartha Gupta, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 1090 days.

(21) Appl. No.: 17/436,194

(22) PCT Filed: Mar. 5, 2020

(86) PCT No.: PCT/US2020/021065
§ 371 (c)(1),
(2) Date: Sep. 3, 2021

(87) PCT Pub. No.: WO2020/181028
PCT Pub. Date: Sep. 10, 2020

(65) Prior Publication Data
US 2022/0146498 A1    May 12, 2022

Related U.S. Application Data

(60) Provisional application No. 62/814,110, filed on Mar. 5, 2019.

(51) Int. Cl.
*G01N 33/50* (2006.01)
*B01L 3/00* (2006.01)

(52) U.S. Cl.
CPC .... *G01N 33/5085* (2013.01); *B01L 3/502715* (2013.01); *B01L 3/50273* (2013.01);
(Continued)

(58) Field of Classification Search
CPC ........ G01N 33/5085; G01N 2333/4354; B01L 3/502715; B01L 3/50273; B01L 3/502753;
(Continued)

(56) References Cited

U.S. PATENT DOCUMENTS

| | | | |
|---|---|---|---|
| 2002/0003625 A1* | 1/2002 | Hansen | G01N 15/1433 356/338 |
| 2015/0094219 A1* | 4/2015 | Trowell | C12Q 1/66 422/69 |

(Continued)

FOREIGN PATENT DOCUMENTS

| | | |
|---|---|---|
| CN | 103461279 | 11/2015 |
| EP | 3209790 | 8/2017 |

(Continued)

OTHER PUBLICATIONS

Natalia A. Bakhtina et al: "Microfluidic laboratories for C.elegansenhance fundamental studies in biology", RSC Adv., vol. 4, No. 9, Jan. 1, 2014 (Jan. 1, 2014), pp. 4691-4709.

(Continued)

*Primary Examiner* — Michael L Hobbs
(74) *Attorney, Agent, or Firm* — Dickinson Wright PLLC; Ina Agaj

(57) ABSTRACT

The present invention includes a system and method for analyzing animals including: a media reservoir and a media pump in fluid communication with the media reservoir; a food reservoir and a food pump in fluid communication with the food reservoir; an input port in fluid communication with the media pump and the food pump; a microfluidic device in fluid communication with the input port including: a micropillar arena or a plurality of micropillar chambers; an outlet port in fluid communication with the microfluidic device; a light source positioned outside the micropillar arena to illuminate the interior of the micropillar arena; an imager (Continued)

positioned outside the micropillar arena to image the interior of the micropillar arena; and a controller coupled to the media pump, the food pump, the microfluidic device, the light source, and the imager.

6 Claims, 21 Drawing Sheets

(52) U.S. Cl.
CPC .................. *B01L 2200/0684* (2013.01); *B01L 2300/0663* (2013.01); *B01L 2300/0883* (2013.01); *G01N 2333/43534* (2013.01)

(58) Field of Classification Search
CPC ..... B01L 2300/0684; B01L 2300/0663; B01L 2300/0883; B01L 2300/43534
See application file for complete search history.

(56) References Cited

U.S. PATENT DOCUMENTS

| | | | |
|---|---|---|---|
| 2015/0315631 A1* | 11/2015 | Handique | C12Q 1/686 506/26 |
| 2017/0312748 A1 | 11/2017 | Cornaglia et al. | |
| 2018/0161771 A1 | 6/2018 | Vanapalli et al. | |
| 2018/0264464 A1* | 9/2018 | Greef | B01L 3/5023 |
| 2019/0070605 A1* | 3/2019 | Haun | C12M 45/02 |

FOREIGN PATENT DOCUMENTS

| | | | |
|---|---|---|---|
| WO | 2016063199 A1 | 4/2016 | |
| WO | WO-2016200758 A1 * | 12/2016 | ............ B01L 3/5027 |
| WO | 2019/077558 A1 | 4/2019 | |

OTHER PUBLICATIONS

Venkataragavalu Sivagnanam et al: "Exploring Living Multicellular Organisms, Organs, and Tissues Using Microfluidic Systems", Chemical Reviews, vol. 113, No. 5, May 8, 2013 (May 8, 2013), pp. 3214-3247.
Ai, X., et al. "A high-throughput device for size based separation of C-elegans developmental stages." Lab on a Chip (2014), 14:1746-1752.
Aitlhadj, L. & Sturzenbaum, S. The use of FUdR can cause prolonged longevity in mutant nematodes. Mechanisms of Ageing and Development (2010), 131:364-365.
Albrecht, D. & Bargmann, C. "High-content behavioral analysis of Caenorhabditis elegans in precise spatiotemporal chemical environments." Nature Methods (2011), 8:599-605.
Anderson, E., et al. "C-elegans lifespan extension by osmotic stress requires FUdR, base excision repair, FOXO, and sirtuins." Mechanisms of Ageing and Development (2016), 154:30-42.
Angeli, S., et al. "A DNA synthesis inhibitor is protective against proteotoxic stressors via modulation of fertility pathways in Caenorhabditis elegans." Aging (2013) 5:759-769.
Bishop, N. & Guarente, L., "Two neurons mediate diet-restriction-induced longevity in C-elegans." Nature (2007), 447:545-550.
Chalfie, M., et al., "Green fluorescent protein as a marker for gene-expression." Science (1994), 263:802-805.
Chuang, H., et al., "Exercise in an electrotactic flow chamber ameliorates age-related degeneration in Caenorhabditis elegans." Scientific Reports (2016), 6:28064.
Chung, K. et al., "Microfluidic chamber arrays for whole-organism behavior-based chemical screening." Lab on a Chip (2011), 11:3689-3697.
Churgin, M. A., et al. "Longitudinal imaging of Caenorhabditis elegans in a microfabricated device reveals variation in behavioral decline during aging." eLife (2017) 6:e26652.

Consortium, C. e. S. & Consortium, C. e. S. Genome sequence of the nematode C-elegans: A platform for investigating biology. Science (1998), 282:2012-2018.
Dong, L., Cornaglia, M., Lehnert, T. & Gijs, M. On-chip microfluidic biocommunication assay for studying male-induced demise in C. elegans hermaphrodites. Lab on a Chip (2016), 16:4534-4545.
Farooqui, T. & Farooqui, A. A. Aging: An important factor for the pathogenesis of neurodegenerative diseases. Mechanisms of aging and development (2009), 130:203-215.
Fielenbach, N. & Antebi, A. "C-elegans dauer formation and the molecular basis of plasticity." Genes & Development (2008), 22:2149-2165.
Fire, A., et al., "Potent and specific genetic interference by double-stranded RNA in Caenorhabditis elegans." Nature (1998), 391:806-811.
Gandhi, S., Santelli, J., Mitchell, D. H., Stiles, J. W. & Sanadi, D. R. A simple method for maintaining large, aging populations of Caenorhabditis elegans. Mechanisms of aging and development (1980), 12:137-150.
Greer, E. & Brunet, A. "Different dietary restriction regimens extend lifespan by both independent and overlapping genetic pathways in C-elegans." Aging Cell (2009), 8:113-127.
Halldorsson, S., et al., "Advantages and challenges of microfluidic cell culture in polydimethylsiloxane devices." Biosensors & Bioelectronics (2015), 63:218-231.
Harman, D. "The aging process: Major risk factor for disease and death." Proceedings of National Academy of Science (1991), 88:5360-5363.
Hartman, J. et al. Swimming Exercise and Transient Food Deprivation in Caenorhabditis elegans Promote Mitochondrial Maintenance and Protect Against Chemical-Induced Mitotoxicity. Scientific Reports (2018), 8:8359.
Hulme, S. et al. Lifespan-on-a-chip: microfluidic chambers for performing lifelong observation of C. elegans. Lab on a Chip (2010), 10:589-597.
Kauffman, A. L., et al., "Insulin signaling and dietary restriction differentially influence the decline of learning and memory with age." PLos Biology (2010), 8:e1000372.
Kenyon, C. "The plasticity of aging: Insights from long-lived mutants." Cell (2005), 120:449-460.
Kenyon, C. J. "The genetics of ageing." Nature (2010), 464:504-512.
Laranjeiro, R., et al., "Single swim sessions in C. elegans induce key features of mammalian exercises." BioMed Central Biology (2017) 15:30.
Letizia, M. et al. "Microfluidic-enabled phenotyping of a whole population of C. elegans worms over their embryonic and post-embryonic development at single-organism resolution." Microsystems & Nanoengineering (2018), 4:6.
Lucanic, M., Plummer, et al., "Impact of genetic background and experimental reproducibility on identifying chemical compounds with robust longevity effects." Nature communication (2017), 8:14256.
McDonald, J. C. et al. "Fabrication of microfluidic systems in poly(dimethylsiloxane)." Electrophoresis (2000) 21:27-40.
Mitchell, D. H., Stiles, J. W., Santelli, J. & Sanadi, D. R. Synchronous growth and aging of Caenorhabditis elegans in the presence of Fluorodeoxyuridine. The Journal of gerontology (1979), 34:28-36.
Niccoli, T. & Partridge, L. "Ageing as a Risk Factor for Disease." Current Biology (2012) 22:R741-R752.
North, B. J. & Sinclair, D. A. "The intersection between aging and cardiovascular disease." Circulation research (2012), 110:1097-1108.
Pittman, W., et al., "A simple culture system for long-term imaging of individual C. elegans." Lab on a Chip (2017), 17:3909-3920.
Rahman, M. et al. "NemaFlex: A microfluidics-based technology for measurement of muscular strength of C. elegans." Lab on a chip (2018), 18:2187-2201.
Ran, F. et al. "Genome engineering using the CRISPR-Cas9 system." Nature Protocols (2013), 8:2281-2308.
Shaye, D. & Greenwald, I. "OrthoList: A Compendium of C. elegans Genes with Human Orthologs". Plos One (2011) 6:e20085.
Stroustrup, N. et al. The Caenorhabditis elegans Lifespan Machine. Nature Methods (2013), 10:665-670.

(56) References Cited

OTHER PUBLICATIONS

Stroustrup, N. et al. "The temporal scaling of Caenorhabditis elegans ageing." Nature (2016), 530:103-107.
Szewczyk, N. et al. "Delayed development and lifespan extension as features of metabolic lifestyle alteration in C-elegans under dietary restriction." Journal of Experimental Biology (2006), 209:4129-4139.
Van Raamsdonk, J. & Hekimi, S. "FUdR causes a twofold increase in the lifespan of the mitochondrial mutant gas-1." Mechanisms of Ageing and Development (2011), 132:519-521.
Van Voorhies, W. Production of sperm reduces nematode life-span. Nature (1992), 360:456-458.
Wen, H., Shi, W. & Qin, J. Multiparameter evaluation of the longevity in C-elegans under stress using an integrated microfluidic device. Biomedical Microdevices (2012), 14:721-728.
Wen, H., Yu, Y., Zhu, G., Jiang, L. & Qin, J. A droplet microchip with substance exchange capability for the developmental study of C-elegans. Lab on a Chip (2015), 15:1905-1911.
White, M. C. et al. "Age and cancer risk: a potentially modifiable relationship." American journal of preventive medicine (2014), 46:S7-15.
Xian, B. et al. "WormFarm: a quantitative control and measurement device toward automated Caenorhabditis elegans aging analysis." Aging Cell (2013), 12:398-409.
Zhang, W. B. et al. "Extended twilight among isogenic c. elegans causes a disproportionate scaling between lifespan and health." Cell Systems (2016) 3:333-345.
International Search Report and Written Opinion for PCT/US2020/021065 dated Jun. 2, 2020.

\* cited by examiner microfluidic device 20

Sieve channels

Micropillar arena 22

Sieve channel

Flow distribution zone

Step 1: Trap animals in the necks

Step 2: Push animals into the camber

Neck to trap animals

Flow and side channel

Top cover plate

Bottom chassis iPOD holder – top iPOD holder – top

AUTOMATED MICROFLUIDIC SYSTEM FOR LIFESPAN AND HEALTHSPAN ANALYSIS IN NEMATODES

CROSS-REFERENCE TO RELATED APPLICATIONS

This application claims priority to and is the National Stage of International Application No. PCT/US2020/021065, filed on Mar. 5, 2020 and claims priority to U.S. Provisional Application Ser. No. 62/814,110, filed Mar. 5, 2019, the entire contents of which are incorporated herein by reference.

STATEMENT OF FEDERALLY FUNDED RESEARCH

This invention was made with government support under AG050503 awarded by the National Institutes of Health, and NNX15AL16G awarded by NASA. The government has certain rights in the invention.

TECHNICAL FIELD OF THE INVENTION

The present invention relates in general to the field of the automated microfluidic system for lifespan and healthspan analysis of organisms, e.g., nematodes.

BACKGROUND OF THE INVENTION

Without limiting the scope of the invention, its background is described in connection with imaging devices.

Aging is a significant risk factor for a broad range of diseases including neurodegenerative disorders, diabetes and cancer[1-5]. With the growing aging population, the socio-economic burden attributed with age-associated diseases is staggering and development of therapies that promote healthy aging is imperative. C. elegans is a powerful model organism for aging investigations with a short lifespan (3-5 weeks), remarkable genetic similarity with humans (~38% orthologs[6]) and conserved signaling pathways[7]. Additionally, a fully mapped genome[8] and incredible genetic plasticity[9,10] makes C. elegans an attractive tool for aging studies. Advances in fluorescent microscopy[11] and genomic technology (RNAi, CRISPR)[12,13] have further expanded the number of possible ways in which C. elegans can be used to study healthy aging.

Lifespan analysis has become a classic method for evaluating the effects of a wide variety of genes, proteins, and pharmaceutical compounds on aging and age-associated diseases. However, traditional lifespan analysis is generally low-throughput and lacks the capability of non-invasive health metric analysis. Aging assays are generally carried out with C. elegans reared on agar plates containing nematode growth media (NGM) where animals crawl. During reproductive stage, adults must be manually transferred to new plates to separate progeny from the original sample. To reduce the need for manual transfers, many labs utilize a strong progeny-blocking drug (2'-deoxy-5-fluorouridine, FUdR) to maintain an adult-only population[14-16]. An alternative to this approach is the use of sterile mutants[17-19].

The simplicity of using FUdR or sterile mutants has led to new technologies for large-scale lifespan analysis in crawling C. elegans. A technology known as Lifespan Machine (LSM), allows for the analysis of a population of thousands of animals grown on agar supplemented with FUdR and automatically captures sequential images to score animals death and determine lifespan[20]. The LSM technology has provided insights into temporal scaling of ageing dynamics[20,21] and helped identify chemical compounds with robust longevity effects[22]. Similarly, WorMotel technology facilitates longitudinal analysis of individuals in agar-filled microfabricated well plates[23]. Despite the large-scale capacity of such technologies, the use of FUdR in LSM and WorMotel technologies is disconcerting as FUdR has been shown to activate stress response pathways[24,25], increase fat accumulation[26] and alter lifespan in some genotypes[24,26,27].

Additionally, current technologies like LSM and WorMotel lack the capability to study the effects of temporary environmental manipulations on lifespan. Such manipulations at user-defined time intervals have been central to studies on dietary restriction[28] and cognitive aging[29]. Currently, traditional studies and high-throughput lifespan technologies do not have the capacity to quickly and reversibly manipulate environmental conditions, limiting their utility to survival analysis on animals exposed to a singular environment.

In recent years, microfluidic approaches have begun to address the limitations of agar-based lifespan assays[30-34]. Several key advantages of using PDMS-based microfluidics include (i) excellent permeability to oxygen and carbon dioxide enabling animals to experience natural atmospheric conditions[35]; (ii) size-based separation of progeny using on-chip filters[30,31,33], eliminating the need to prevent or reduce progeny production; (ii) precise temporal control of culture environment via addition or removal of reagents[31,33]; (iii) overall reduction in the number of censored worms; and (iv) optical transparency of devices to enable white light and fluorescence imaging.

Despite the significant advantages of microfluidics-based approaches, work to date has been limited on three fronts. First, existing microfluidic devices for lifespan studies[30,31,33,34,36,37] house animals in chambers where they swim rather than crawl, therefore do not mimic the plate-like animal behavior that is standard in the C. elegans community. Housing worms in liquid culture for a significant portion of their lifespan induces changes in gene expression[38,39]. Additionally, obligated swimming has been shown to induce fatigue and oxidative stress—outcomes that are not present in plate-grown animals[39-41]. In contrast to swim chambers, some studies reported micropillar chambers for C. elegans assays[42,43], but none have been configured and validated for lifelong or aging investigations. Second, most microfluidic studies have not integrated the different components needed for aging assays into a compact system. These components include fluid delivery systems (e.g. pumps), illumination source and imaging hardware. Lack of this integration introduces inefficiencies and reduces throughput for aging assays. Third, the scoring of animal survival and locomotion is often manual, making it tedious to analyze large image data sets. In addition, lack of a streamlined workflow for data analysis can introduce false positives and bias in the analysis.

On such system is taught in EP 3209790 A1, filed by Cornaglia, et al., entitled "Microfluidic Device, System and Method for the Study of Organisms". Briefly, these applicants are said to teach a microfluidic device for the culture, selection and/or analysis of sample organisms such as nematodes, as well as for other biological entities such as for instance animal embryos. The device is said to include reservoirs, culture chambers and smart filtering systems allowing for the selection of specific populations/specimens of sample organisms, thus permitting long-term cultures thereof as well as phenotypic/behavioral analyses.

However, despite such devices a need remains for a device that permits the long-term study of organisms, such as nematodes, that more closely mirrors their natural habitat and that does not affect the expression of genes in the organism as with devices of the prior art.

SUMMARY OF THE INVENTION

In some embodiments of the disclosure, a system for analyzing animals is disclosed as including: a media reservoir and a media pump in fluid communication with the media reservoir; a food reservoir and a food pump in fluid communication with the food reservoir; an input port in fluid communication with the media pump and the food pump; a microfluidic device in fluid communication with the input port including: (1) a micropillar arena for containment of the animals, the micropillar arena, wherein the micropillar arena comprises a plurality of micropillars to permit the animals to crawl within it, and wherein the micropillar arena has a boundary of a circular, oval, square, rectangular, or other polygonal shape, or a shape comprising some combination of those shapes; or (2) a plurality of micropillar chambers, wherein each micropillar chamber is configured to permit a single animal to crawl within it; and a transparent outer surface for at least illumination or imaging; an outlet port in fluid communication with the microfluidic device; a light source positioned outside the micropillar arena to illuminate an interior of the micropillar arena; an imager positioned outside the micropillar arena to image the interior of the micropillar arena; and a controller coupled to the media pump, the food pump, the microfluidic device, the light source, and the imager. In one aspect, the microfluidic device includes: an input flow distribution area in fluid communication with the input port; the micropillar arena in fluid communication with the input flow distribution area, wherein the plurality of micropillars is distributed in a pattern configured to permit the animals to crawl in spaces between the micropillars and to permit retaining adult animals while removing progeny animals; and including an organism loading port and a plurality of sieve channels to permit removal of progeny animals; and an outlet flow distribution area in fluid communication with the micropillar arena in fluid communication with the outlet port. In another aspect, each of the micropillars has a circular, oval, square, rectangular, or other polygonal cross-section, or a cross-section including some combination of those shapes. In another aspect, the micropillar arena includes: a distribution channel for introduction of the animals, including an inlet end and an outlet end, with the inlet end in fluid communication with the input port and with the outlet end in fluid communication with the outlet port; wherein the plurality of micropillar chambers is distributed along the distribution channel and in fluid communication with it, each micropillar chamber including a tapered neck for size-based selection and entrapment of a single animal in each micropillar chamber with a sufficiently high fluid flow rate. In another aspect, each of the micropillar chambers has a circular, oval, square, rectangular, or other polygonal cross-section, or a cross-section including some combination of those shapes. In another aspect, the analyzing includes at least one of recording motion of the animals, counting live and dead animals, studying behavior of the animals, or studying mobility of the animals. In another aspect, the animals are nematodes of at least the genus *Caenorhabditis*. In another aspect, the light source includes a light-emitting diode. In another aspect, the imager is a digital imager.

In some embodiments of the disclosure, a method of analyzing animals is disclosed as including: providing a plurality of animals to be analyzed; loading the plurality of animals into an analysis device including: a media reservoir and a media pump in fluid communication with the media reservoir; a food reservoir and a food pump in fluid communication with the food reservoir; an input port in fluid communication with the media pump and the food pump; a microfluidic device in fluid communication with the input port including: (1) a micropillar arena for containment of the animals, the micropillar arena, wherein the micropillar arena comprises a plurality of micropillars to permit the animals to crawl within it, and wherein the micropillar arena has a boundary of a circular, oval, square, rectangular, or other polygonal shape, or a shape comprising some combination of those shapes; or (2) a plurality of micropillar chambers, wherein each micropillar chamber is configured to permit a single animal to crawl within it; and a transparent outer surface for at least illumination or imaging; an outlet port in fluid communication with the microfluidic device; a light source positioned outside the micropillar arena to illuminate an interior of the micropillar arena; an imager positioned outside the micropillar arena to image the interior of the micropillar arena; and a controller coupled to the media pump, the food pump, the microfluidic device, the light source, and the imager; illuminating the plurality of animals through the transparent outer surface; imaging the plurality of animals through the transparent outer surface to produce images; and analyzing the images. In one aspect, the microfluidic device includes: an input flow distribution area in fluid communication with the input port; the micropillar arena in fluid communication with the input flow distribution area, wherein the plurality of micropillars is distributed in a pattern configured to permit the animals to crawl in spaces between the micropillars and to permit retaining adult animals while removing progeny animals; and including an organism loading port and a plurality of sieve channels to permit removal of progeny animals; and an outlet flow distribution area in fluid communication with the micropillar arena in fluid communication with the outlet port. In another aspect, each of the micropillars has a circular, oval, square, rectangular, or other polygonal cross-section, or a cross-section including some combination of those shapes. In another aspect, a distribution channel for introduction of the animals, including an inlet end and an outlet end, with the inlet end in fluid communication with the input port and with the outlet end in fluid communication with the outlet port; wherein the plurality of micropillar chambers is distributed along the distribution channel and in fluid communication with it, each micropillar chamber including a tapered neck for size-based selection and entrapment of a single animal in each micropillar chamber with a sufficiently high fluid flow rate. In another aspect, each of the micropillar chambers has a circular, oval, square, rectangular, or other polygonal cross-section, or a cross-section including some combination of those shapes. In another aspect, the analyzing includes at least one of recording motion of the animals, counting live and dead animals, studying behavior of the animals, or studying mobility of the animals. In another aspect, the animals are nematodes of at least the genus *Caenorhabditis*. In another aspect, the light source includes a light-emitting diode. In another aspect, the imager is a digital imager.

In some embodiments of the disclosure, a system for analyzing nematodes is disclosed as including: a media reservoir and a media pump in fluid communication with the media reservoir; a food reservoir and a food pump in fluid communication with the food reservoir; an input port in fluid communication with the media pump and the food pump; a microfluidic device in fluid communication with the input port including: (1) a micropillar arena for containment of the nematodes, the micropillar arena, wherein the micropillar arena comprises a plurality of micropillars to permit the animals to crawl within it, and wherein the micropillar arena has a boundary of a circular, oval, square, rectangular, or other polygonal shape, or a shape comprising some combination of those shapes; or (2) a plurality of micropillar chambers, wherein each micropillar chamber is configured to permit a single animal to crawl within it; and a transparent outer surface for at least illumination or imaging; an outlet port in fluid communication with the microfluidic device; a light source positioned outside the micropillar arena to illuminate an interior of the micropillar arena; an imager positioned outside the micropillar arena to image the interior of the micropillar arena; and a controller coupled to the media pump, the food pump, the microfluidic device, the light source, and the imager. In one aspect, the microfluidic device includes: an input flow distribution area in fluid communication with the input port; the micropillar arena in fluid communication with the input flow distribution area, wherein the plurality of micropillars is distributed in a pattern configured to permit the nematodes to crawl in spaces between the micropillars and to permit retaining adult nematodes while removing progeny nematodes; and including a nematode loading port and a plurality of sieve channels to permit removal of progeny nematodes; and an outlet flow distribution area in fluid communication with the micropillar arena in fluid communication with the outlet port. In another aspect, each of the micropillars has a circular, oval, square, rectangular, or other polygonal cross-section, or a cross-section including some combination of those shapes. In another aspect, the micropillar arena includes: a distribution channel for introduction of the nematodes, including an inlet end and an outlet end, with the inlet end in fluid communication with the input port and with the outlet end in fluid communication with the outlet port; wherein the plurality of micropillar chambers is distributed along the distribution channel and in fluid communication with it, each micropillar chamber including a tapered neck for size-based selection and entrapment of a single nematode in each micropillar chamber and configured to permit the single nematode to crawl within it. In another aspect, each of the micropillar chambers has a circular, oval, square, rectangular, or other polygonal cross-section, or a cross-section including some combination of those shapes. In another aspect, the analyzing includes at least one of recording motion of the nematodes, counting live and dead nematodes, studying behavior of the nematodes, or studying mobility of the nematodes. In another aspect, the nematodes are of at least the genus *Caenorhabditis*. In another aspect, the light source includes a light-emitting diode. In another aspect, the imager is a digital imager.

BRIEF DESCRIPTION OF THE DRAWINGS

For a more complete understanding of the features and advantages of the present invention, reference is now made to the detailed description of the invention along with the accompanying figures and in which:

(FIG. 2A) The microfluidic device for culturing of C. elegans. The device is filled with a blue food dye. The rectangular region represented by the dashed black line is the micropillar arena that houses the crawling animals. The flow distribution zone, inlet/outlet ports, sieve channels on both sides of the micropillar arena and animal loading port are highlighted. (FIG. 2B) A micropillar arena loaded with approximately 60 adult animals and the food source E. coli OP50. (FIG. 2C) A section of the sieve channel includes a series of equally spaced rectangular blocks to prevent adults from escaping the micropillar arena, but allow progeny to wash-through. (FIG. 2D) Top view of the micropillar arena (Device I). All dimensions are in μm. (FIG. 2E) & (FIG. 2F) Architecture of the pillar and sieve channel. 100 μm tall and 70 μm diameter pillars are equally spaced (160 μm) in a square lattice and hanging from the ceiling. Repeating 1000 μm×200 μm rectangular blocks with spacing (35 μm) makes the sieve channel. Pillars are arranged in a square lattice. (FIG. 2G) Detail design of flow distribution zone.

(FIG. 3A) The device includes a 3×10 circular micropillar chambers (filed with green food dye) connected in a distribution channel that can house individuals. Dashed black arrows show distribution channel, air purge, inlet, micropillar chamber and outlet. (FIG. 3B) Enlarged view of a section of the microfluidic device showing three chambers. Black arrows show the direction of fluid flow through the distribution channel and through the chambers. A single chamber is shown in the image (red dashed border). Each 3-mm diameter chamber is connected to the upstream channel (red dashed arrow) via a narrow tapered neck/arm (Black arrow) and downstream channel via a sieve channel (black dashed arrow). Enlarged view of an animal crawling in the chamber is shown next to it. Scale bar: 1 mm. (FIG. 3C) Schematic illustration of animal loading protocol by cartridge method. Cartridge is prepared by aspiration of 200 μL of worm solution (yellow) into the tubing followed by buffer solution (blue). (FIG. 3D) Animal trapping at the neck of the chamber by introducing the plug of worm solution (50-100 worms/mL) at 5 ml/hr flow rate for 90 seconds. Each arrow is showing a trapped animal. (FIG. 3E) Trapped worms are pushed into the chamber by introducing buffer solution at the back of the worm solution into the cartridge at 15 ml/hr for 15 seconds. (FIG. 3F) Top view of the entire device. All dimensions are in μm. (FIG. 3G)-(FIG. 3I) detailed design of the sieve channel, tapered loading neck, fluid inlet and air purging port.

(FIG. 4A) an isometric sketch of the housing for the NemaLife Machine (drawn to scale). It can include of (FIG. 4B) top cover plate, (FIG. 4C) bottom chassis, (FIG. 4D) ipod holder—top view, and (FIG. 4E) iPOD holder (top view and 3D view).

(FIG. 7A) Image analysis workflow for tracking worm objects in the image for lifespan and healthspan assay. (FIG. 7B) Graphic user interface of the NemaCode image analysis software. The software allows the user to move between tabs independently to check and validate analysis. Images 7B(i)-(v) shows the major steps of the image analysis software, (i) image rotation and cropping of region of interest (only the worm culture arena), (ii) illumination correction and thresholding, (iii) segmentation, (iv) worm object detection and validation, and (v) annotation of dead and alive.

(FIG. 8A) Number of progeny remaining in the microfluidic device I as a function of pump washing flow rate (FIG. 8B) lifespan of wild-type (N2 isolate) and IG 274 strain with the nlp-29p::GFP reporter induced in the epidermis at 7.5 mL/min pump flow at 20° C. The IG24 strain (FIG. 8C) Lifespan of wild-type (N2 isolate) *C. elegans* at 20° C. at four different diet (concentration of bacteria) fed once every day. (FIG. 8D) Lifespan of wild-type (N2 isolate) *C. elegans* at 20° C. at feeding once a day (24 hr interval) and twice a day (12 hr interval). P-value (12 hr interval vs 24 hr interval)=0.92. (FIG. 8E) Batch to batch variation of lifespan of wild-type (N2 isolate) *C. elegans* in NemaLife system at $20.54 \leq n \leq 67$.

DETAILED DESCRIPTION OF THE INVENTION

Figure 1:
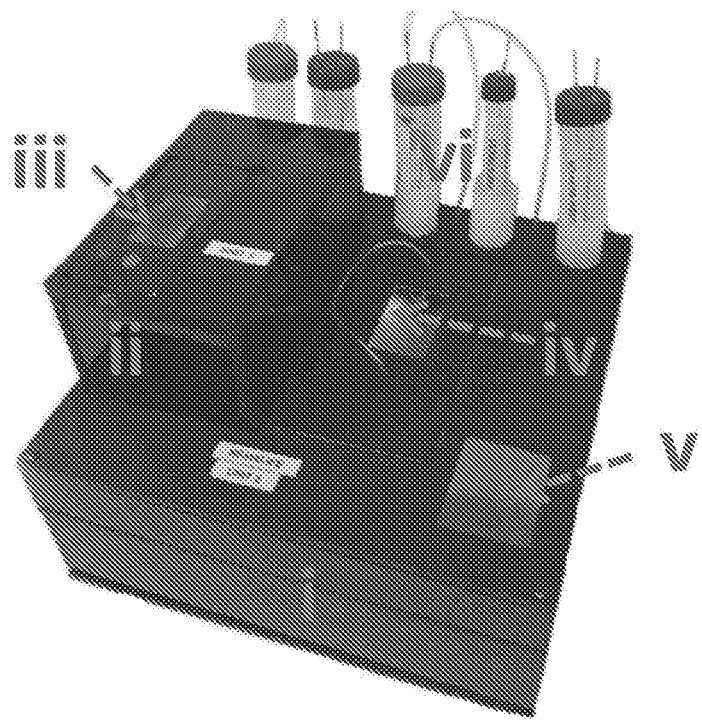
FIG. 1 shows an example of the NemaLife machine description and components of the present invention. Major components of a NemaLife unit, (i) housing for fluidic and electrical module, (ii) iPOD holder, (iii) iPOD for imaging, (iv) slot for microfluidic device. Microfluidic device is illuminated from the side, (v) user-interface display for controlling the unit, and (vi) fluid reservoirs for sterilization of the unit, and washing/feeding of the animals.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

Currently nematode studies involve tedious picking and transferring of animals on culture plates to study them across-life. Exposing the animals to different environments across time is also difficult. Scoring is done manually which may introduce bias. The integrated system and microfluidic culture device of the present invention resolves all these issues. (As used herein, "animals" includes but is not limited to organisms such as nematodes, fish, and tadpoles.)

*Caenorhabditis elegans* is a powerful animal model in aging research. Standard longevity assays on agar plates involve the tedious task of picking and transferring animals to prevent younger progeny from contaminating age-synchronized adult populations. Large-scale studies employ progeny-blocking drugs or sterile mutants to avoid progeny contamination, but such manipulations change adult physiology and alter the influence of reproduction on normal aging. Moreover, for some agar growth-based technology platforms, such as automated lifespan machines, reagents such as food or drugs cannot be readily added/removed after initiation of the study. The present inventors have developed an automated microfluidic system called NemaLife Machine (NLM) that addresses the current limitation of plate-based aging assays. The NLM device integrates: (1) a microfluidic device and flow control system for culturing *C. elegans* with programmed washing of progeny and delivery of food, (2) an illumination and smart-device imaging system for recording motion of a population of animals or individuals, and (3) data analysis software for scoring live/dead animals, behavior and their mobility. The machine is compact with a foot-print of 1 ft², amenable to integration with other microfluidic devices and can be operated via an on-board interactive display. The inventors evaluated various system parameters and developed an operational workflow that robustly yields lifespan and healthspan data on *C. elegans*. Further, the device was validated in longevity studies of classical aging mutants and dietary restriction. Overall, the capacity of the NLM system to generate reliable lifespan and physiological data underscores the potential of this automated machine for genetic and drugs screens, and fundamental investigations on lifespan/healthspan of *C. elegans*.

The present inventors have now developed a novel technology, termed NemaLife Machine (NLM), for aging studies in *C. elegans* that addresses the limitations of agar-based studies and current microfluidic systems. As shown in FIG. 1 the device of the present invention is a compact, benchtop and integrated platform that incorporates all the functionalities needed for whole-life studies of *C. elegans*. Major components of a NemaLife unit, (i) housing for fluidic and electrical module, (ii) iPOD holder, (iii) iPOD for imaging, (iv) slot for microfluidic device. Microfluidic device is illuminated from the side, (v) user-interface display for controlling the unit, and (vi) fluid reservoirs for sterilization of the unit, and washing/feeding of the animals. At the core of the NLM is an optimized micropillar arena enabling animals to adopt a crawling gait similar to that of worms on agar plates while also acting as a screen to retain adults and prevent fluid-induced injury when removing progeny. This microfluidic device is connected to programmable pumps that wash progeny and deliver food as per user defined sequences. An LED-based illumination and a smart-device iPod are integrated into the system that captures videos of animals crawling in the micropillar arena. A custom-written MATLAB software allows the user to analyze the images and score for live/dead animals and mobility. This new technology will accelerate genetic and drug screens and further advance molecular, cellular and tissue-level understanding of healthy aging.

Microfluidic devices for whole-life culture and observation. At the core of the NLM are microfluidic devices that enable culturing and life-long observation. Here, the inventors developed two PDMS-based microfluidic devices. Device I allowed life-long studies of a population (50-100 animals per chamber) of animals, while Device II allows life-long studies of individual animals. The design of the two devices is discussed below.

Figure 2A:
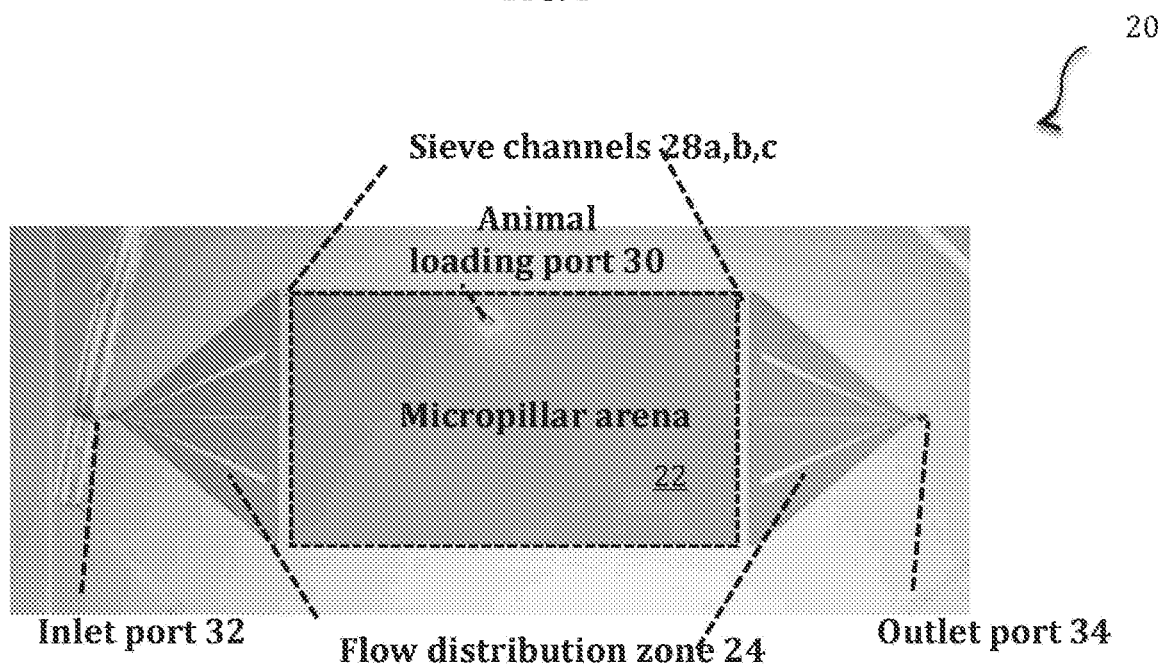
FIGS. 2A to 2G show the detailed design of microfluidic device I.
Figure 2B:
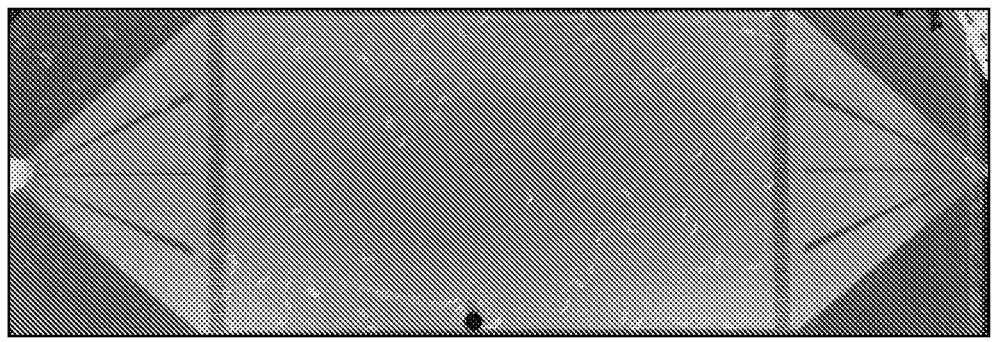
Figure 2C:
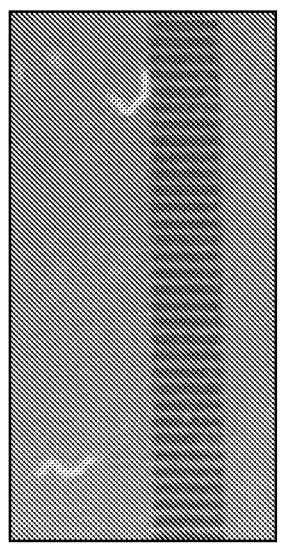

Device I. As shown in FIGS. 2A, 2B, the microfluidic device 20 includes a large rectangular micropillar arena 22, flow distribution zone 24, and sieve channels 28a,b,c. Animals are introduced into the device using the animal loading port 30, an inlet port 32 and an outlet port 34 are used to wash and feed the animals. The arena includes an array of micropillars arranged as a square lattice. The sieve channels allow larvae and eggs to be washed-off but retain the adult population (FIG. 2C). The flow-distribution zone ensures that the introduced flow during washing/feeding uniformly spreads into the entire micropillar chamber.

Figure 2D:
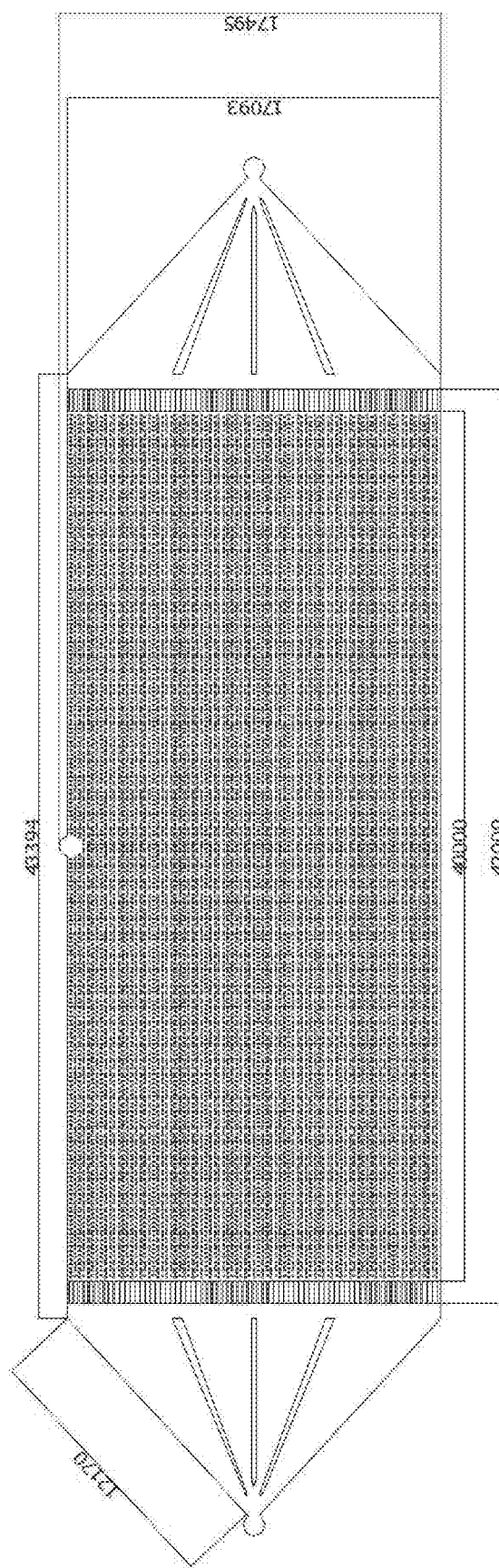
Figure 2E:
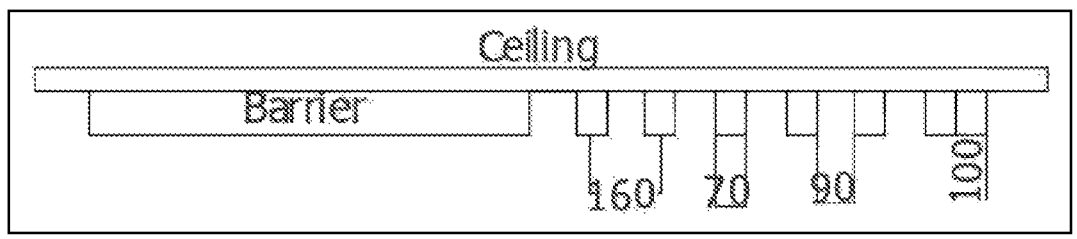
Figure 2F:
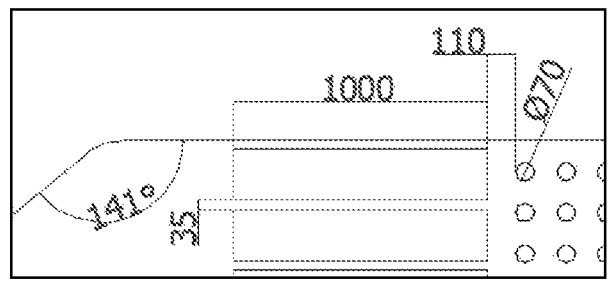
Figure 2G:
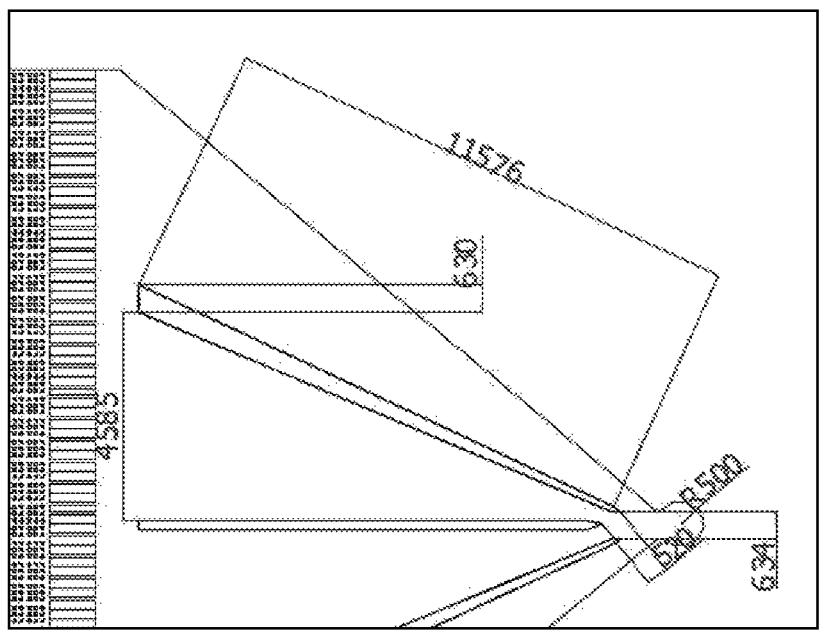

The geometric dimensions of each of the sections are shown in FIGS. 2D-2G. Importantly the micropillar chamber is 40 mm long and 17.1 mm wide (FIG. 2D). As shown in FIG. 2E, the pillars have a diameter of 70 µm, height of 100 µm, and the center-to-center spacing between pillars is 160 µm (or gap between pillars is 90 µm). The sieve channels are 1 mm long and 100 µm wide, and separated by a gap of 35 µm. The flow distribution zone includes a triangular section where two sides have length of 12.2 mm and the third side is the same length as the micropillar chamber width (FIG. 2D). The geometry of the dividers in the flow distribution zone is shown in FIG. 2G.

Figure 3A:
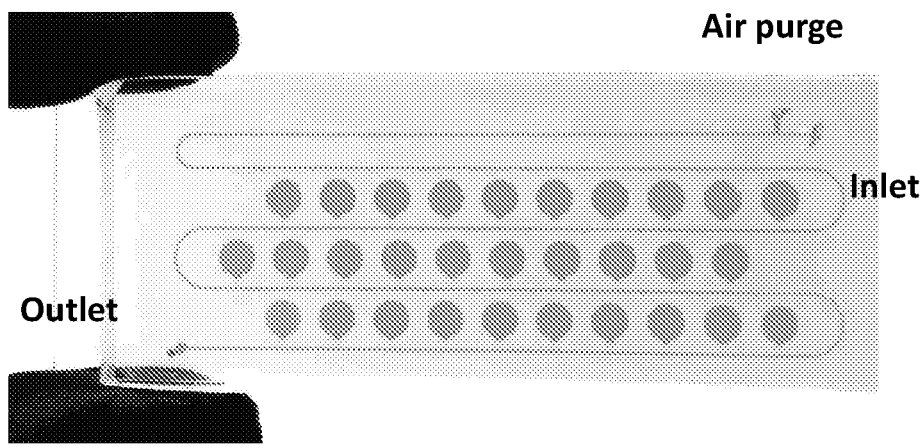
FIGS. 3A to 3I show more details of the microfluidic device for housing and culturing individuals.
Figure 3B:
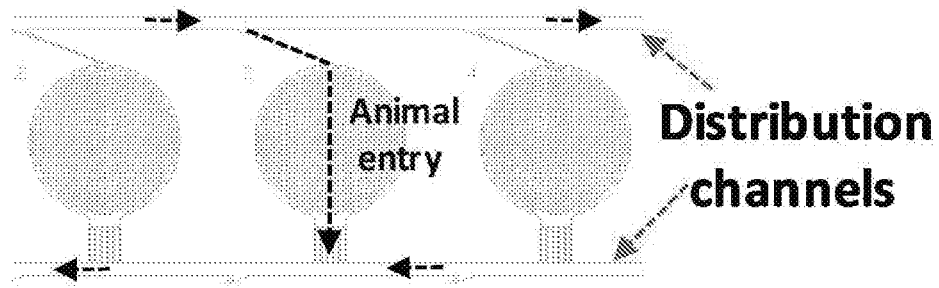
Figure 3B:
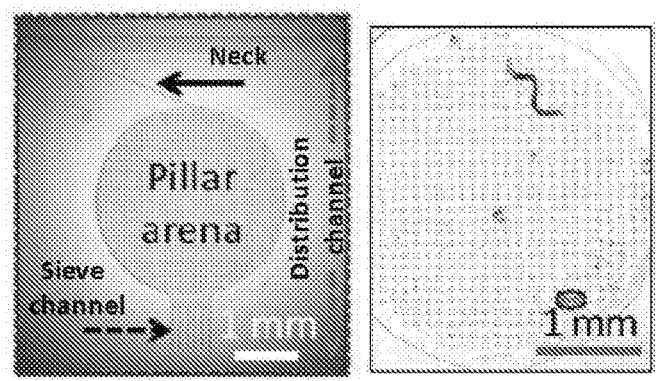

Device II. As shown in FIG. 3A, this microfluidic device includes a series of micropillar chambers that can house individuals. The device design includes an inlet/outlet port and a side channel to purge air. Animals flow through in the distribution channel, and some of the animals bypass the distribution channel and enter into the micropillar chambers (FIG. 3B, top). At the entrance of the micropillar chamber is a tapered neck that allows size-based selection and trapping of a single animal (FIG. 3B, bottom left), followed by forceful injection into the chamber (FIG. 3B, bottom right).

Figure 3C:
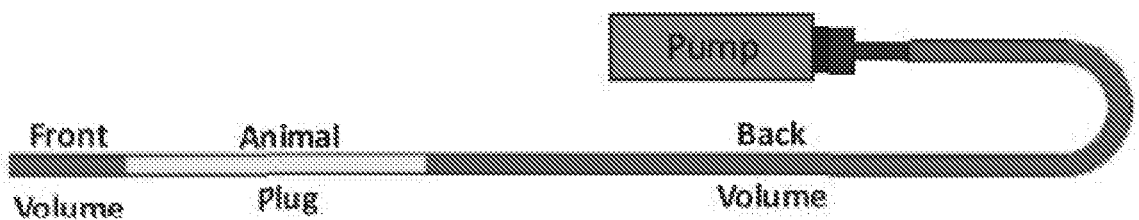
Figure 3D:
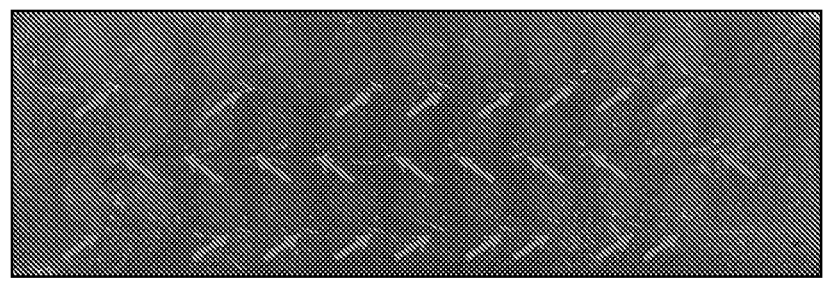
Figure 3E:
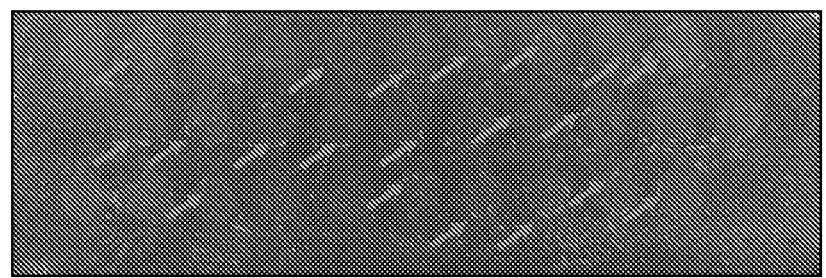
Figure 3F:
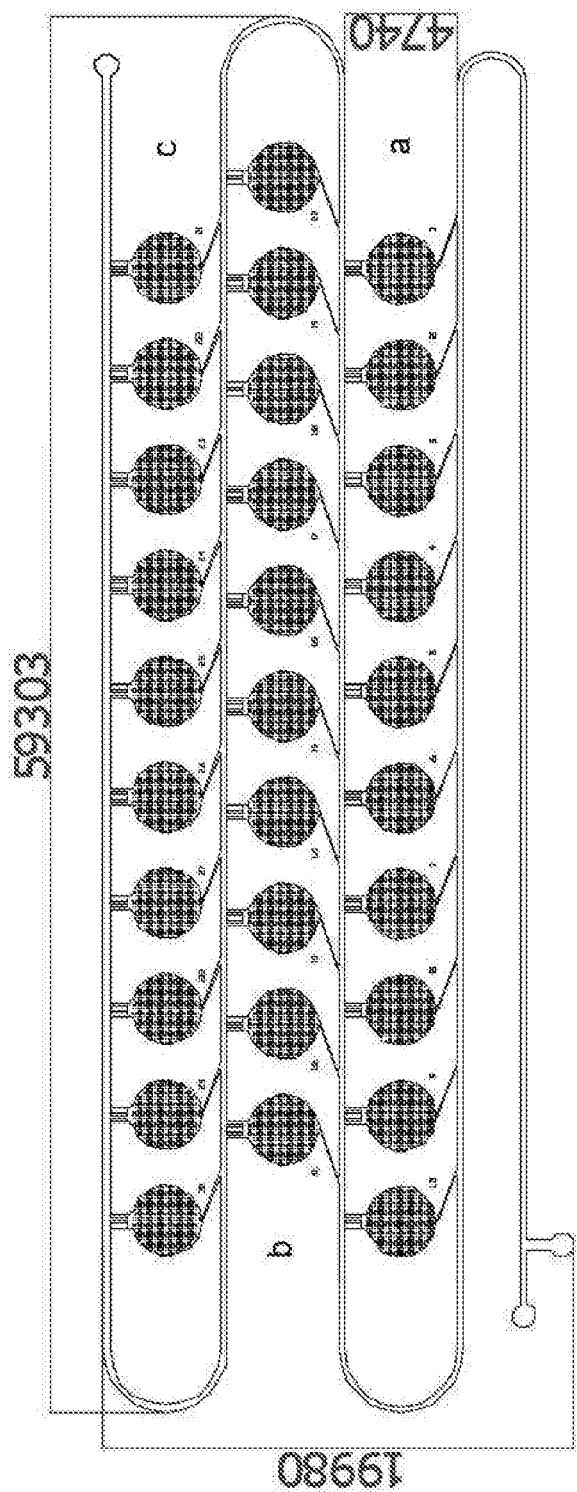
Figure 3G:
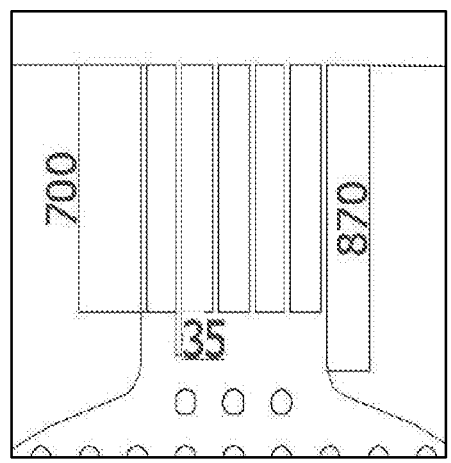
Figure 3H:
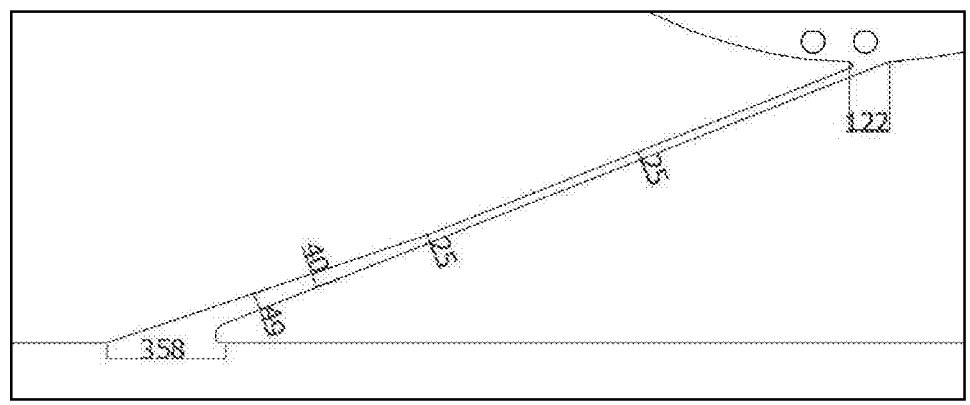
Figure 3I:
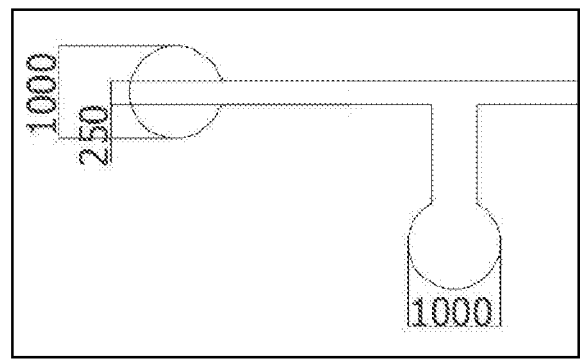

The experimental protocol for capturing individuals in the chambers is based on a unique method of loading. As shown in FIG. 3C, using sequential aspirations, a tubing is filled with growth media at the front (200 µL) and back (600-800 µL), interspersed with an animal solution (20-200 µL). In the first step, the cartridge is primed by a pump at a lower flow rate of 5 mL/hr to enable animals to be trapped in the neck of the micropillar chambers (FIG. 3D), while progeny is washed-off through the sieve channels. In the second step, a higher flow rate of 25 mL/hr is used to force the trapped animals into the chambers. The cartridge method also helps in eliminating excess entry of animals into the chambers.

The geometric dimensions of this device are shown in FIGS. 3F-3I. The flow channels are 250 µm wide. The diameter of the micropillar chamber is 3 mm, with the pillar features same as Device I. The sieve channel has rectangular blocks of length 700 µm and width 100 µm. The gap between the blocks is 35 µm. The tapered neck starts at 350 µm and narrows down to 25 µm, over a length of 2300 µm.

Figure 4A:
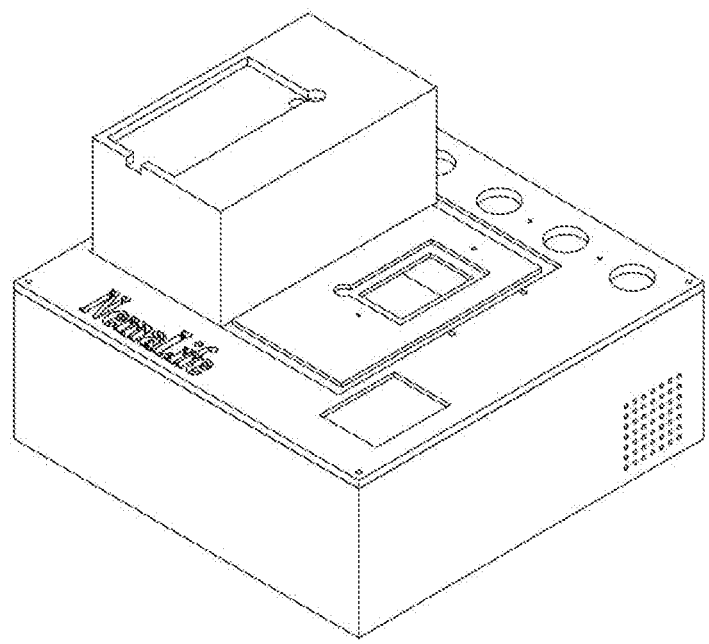
FIGS. 4A to 4E show the detail design of NemaLife Machine.
Figure 4B:
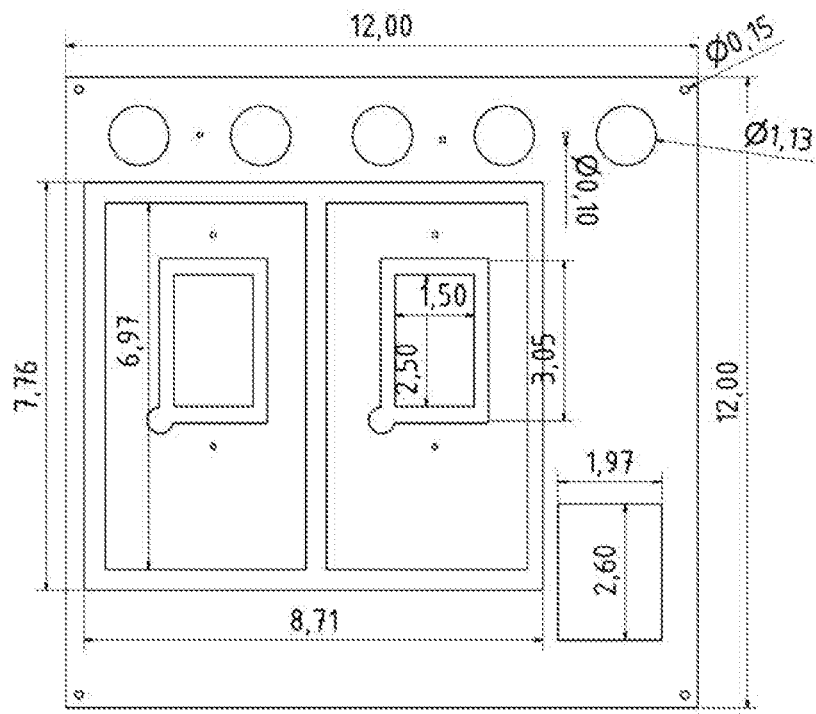
Figure 4C:
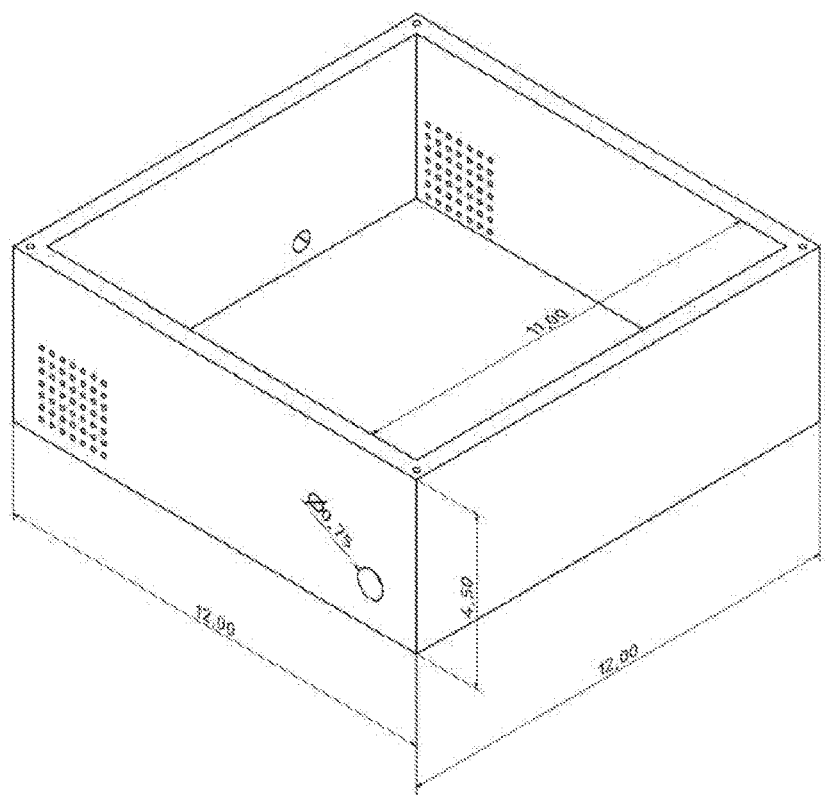
Figure 4D:
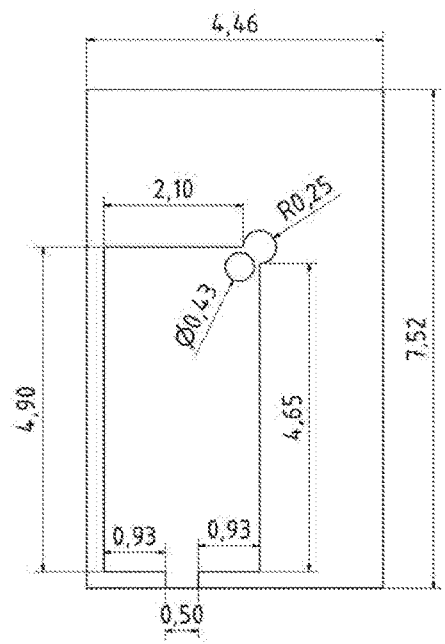
Figure 4E:
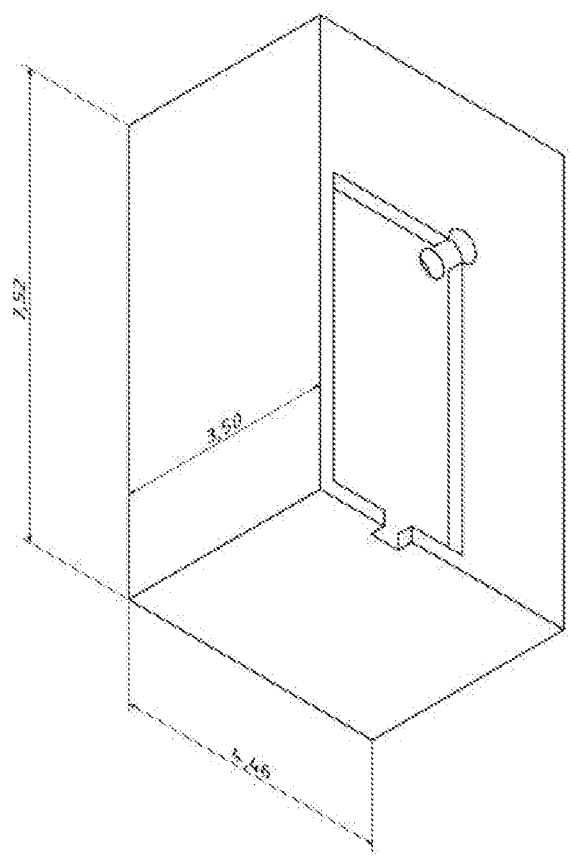

NemaLife machine description. The NLM includes a fluidic, an imaging and a microcontroller system that are integrated into a compact benchtop unit as shown in FIG. 4A. The unit includes two rectangular boxes. The top cover plate (FIG. 4B) of the larger box houses the slots to hold two microfluidic devices, and the bottom chassis (FIG. 4C) houses the LED array, pumps, fans and a printed circuit board. The smaller rectangular box houses the iPod for imaging (FIGS. 4D, 4E). This iPod holder is designed to achieve the optimal focal plane to acquire videos of animals in the micropillar arena. Video acquisition was typically performed at 10-30 fps at a resolution of 1920×1080 pixels and a field of view of 54×30 mm.

Figure 5:
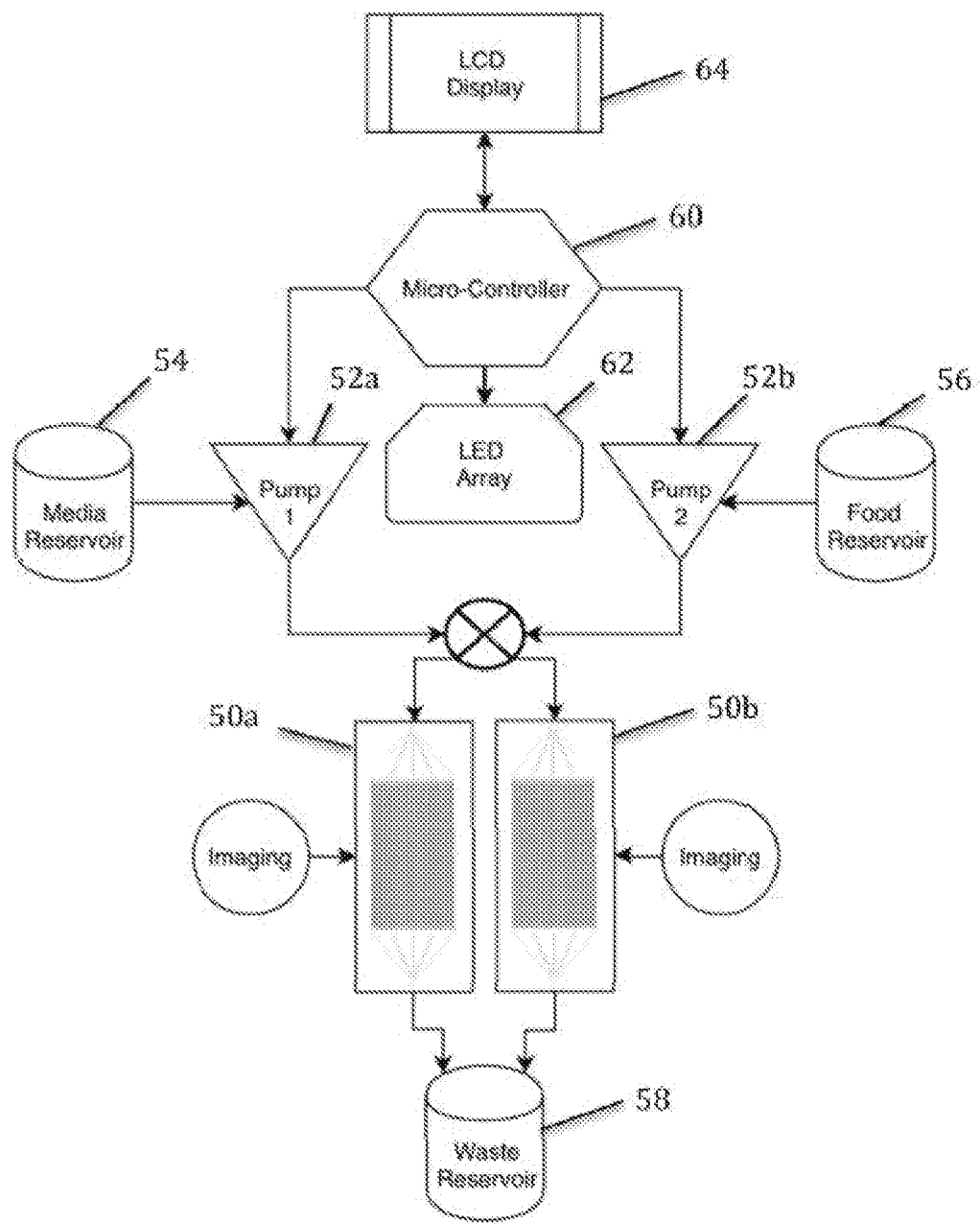
FIG. 5 is a flowchart of a system workflow of the NemaLife machine. Imaging and fluidic system is controlled via a microcontroller and the steps are displayed in the LCD display located on the top cover plate of the machine. Microcontroller takes the user command from the LCD display.

The system operational chart is shown in FIG. 5. The inventors designed the NLM to accommodate two microfluidic devices 50a, 50b allowing the user to run two devices in a single operation of the unit. Two peristaltic pumps 52a, 52b are integrated, where one is used for washing of progeny/eggs and the other is used for feeding by fluidically connecting a media reservoir 54 and a food reservoir 56 to pumps 52a, 52b, through the two microfluidic devices 50a, 50b and into a waste reservoir 58. Check valves are used to direct the fluids from a single pump (52a, 52b) into the two microfluidic devices 50a, 50b. A microcontroller 60 was designed to operate both of the pumps 52a, 52b, LED array 62 and display 64. The display 64 can be an LCD display and can provide an interactive menu with detailed instructions allowing the user to interface with the machine and conduct the experimental workflow.

Figure 6:
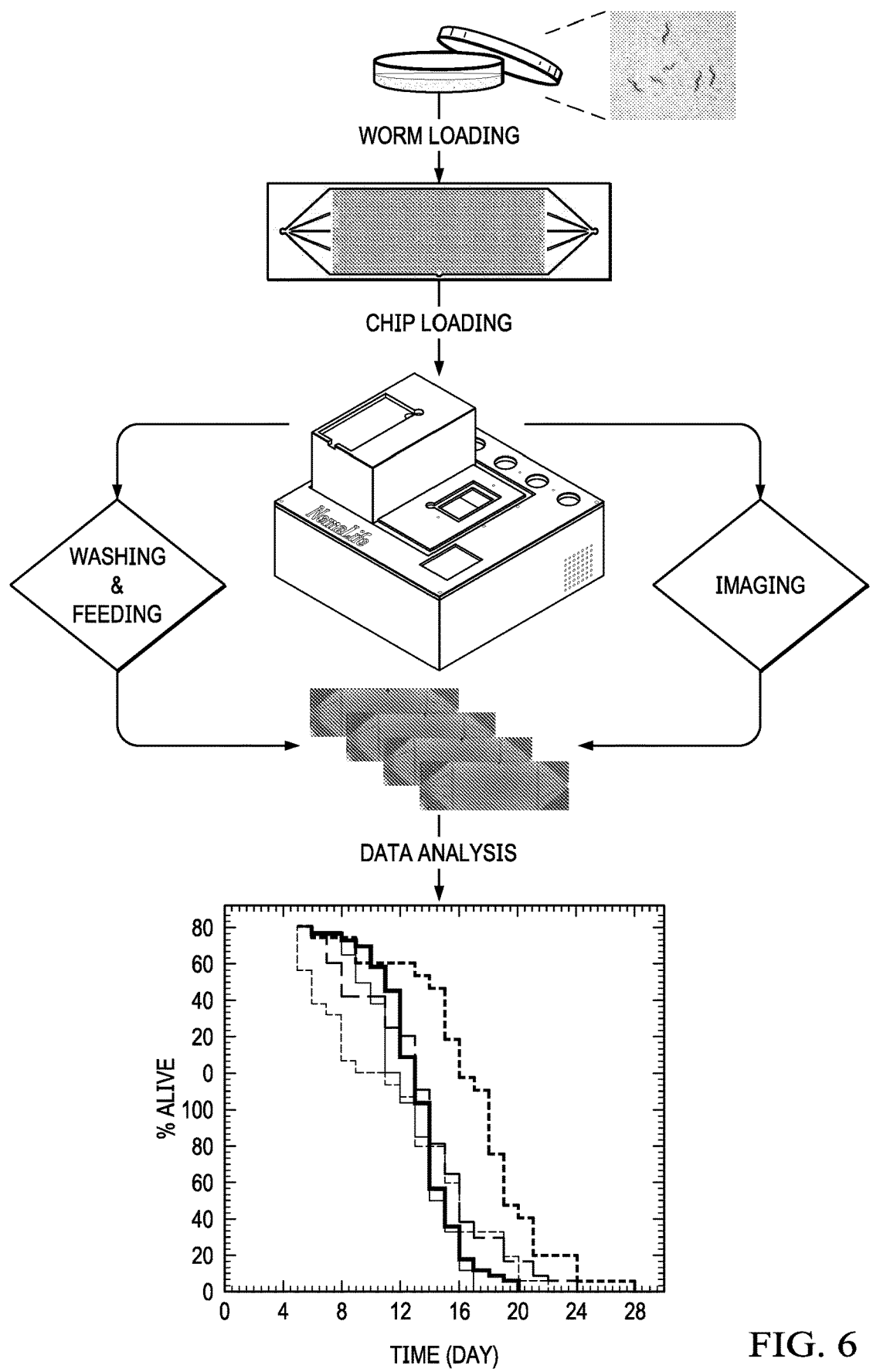
FIG. 6 is an operational workflow of NemaLife. Animals hatched and grown in agar plates are transferred into micropillar arena at L4—young adult stage. Every day the microfluidic devices are washed to separate progeny, feed animals, and imaged by the iPOD. Images are analyzed with image processing software NemaCode to generate lifespan curves.

Workflow. The workflow for conducting aging experiments with the NLM, shown in FIG. 6, involves the following steps: (i) The microfluidic devices are sterilized with 70% Ethanol followed by rinsing with DI water. (ii) Animals are loaded into the microfluidic Devices I and II from age-synchronized cultured plates. Animal age is typically L4—young adults. (iii) Washing and feeding are performed every day on the NLM, with a washing flow rate of 3.5-7.5 mL/hr per chip for 60-120 seconds. Feeding is done at a similar flow rate range for 2-5 seconds. Images are acquired both during washing as well as at the end of the feeding cycle. Video acquisition is done for 30-90 seconds at a frame rate of 10-30 fps. The videos are stored on the iPod or on the cloud and retrieved later for image processing and data analysis.

Data Analysis Software. NemaCode is a GUI driven application for automating C. elegans detection from large datasets of "worm-movies". The application is compiled in MATLAB and relies on MATLAB Compiler Runtime (MCR) environment for the analytics. The application design follows a model-view structure such that the "model" implements functions in a global namespace that can be called upon by the "view" (UI based on MATLAB's App Designer). Each model-function is delegated an independent task by the GUI for either, data handling (upload/export), analytics or result validation using callbacks and event handlers.

Figure 7A:
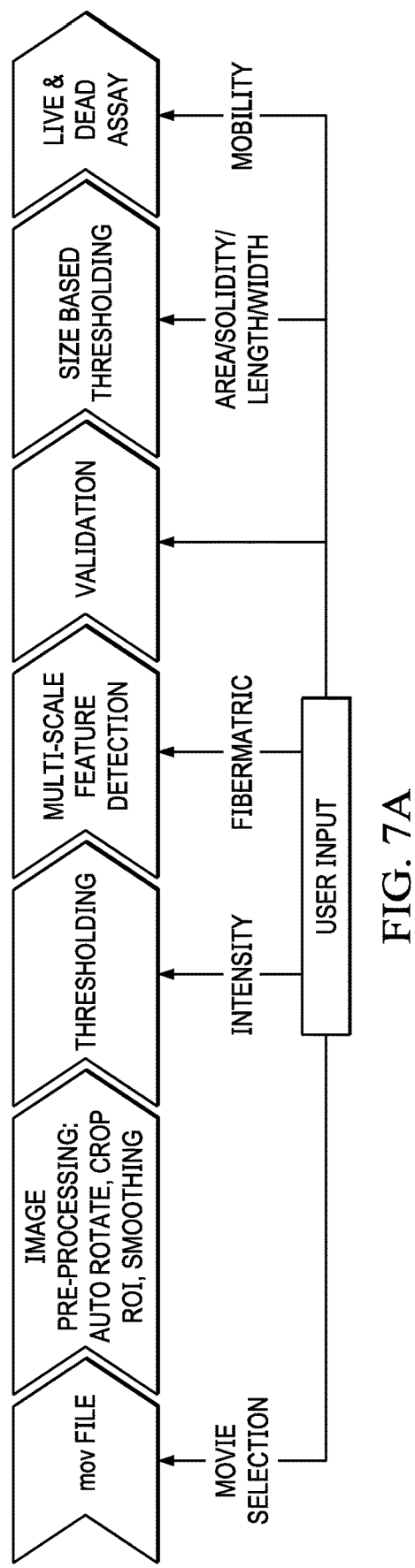
FIGS. 7A and 7B(i)-(v) show workflows for automated image analysis for live/dead scoring.

The analytic steps in the application workflow (see FIG. 7A) can be enumerated as: 1) image pre-processing, 2) object detection, 3) worm filtering, 4) live/dead calculation and 5) locomotion computation.

In step (1) auto-ROI (region of interest) cropping with alignment correction is implemented. The auto cropping function proceeds by applying a median intensity filter to reduce noise and fits a rectangular pulse function to the image intensity at three vertical locations. The midpoint of the fit's rise region provides top and bottom wall locations. Post fit, the wall slope is calculated from the vertical extents to rotate the image and align the device with the horizontal image axis. Next, side walls are determined as peaks in gradient of intensity around the horizontal centerline and ROI is cropped based on the knowledge of sidewalls, top and bottom of the device (see dashed blue line in FIG. 7B, i). Step (1) reduces the image size to the ROI accelerating subsequent analysis.

In step (2), the program implements object detection on the cropped image by intensity-based discrimination and multi-scale feature detection to enhance and segment worm like structures. First, the image cleaning function implements a high pass filter followed by a low pass filter and morphological dilation to enhance contrast and adjust illumination. The filter parameters are set by the external user through the GUI depending on illumination levels and pixel resolution. Next, multi-scale feature detection based on the works of Frangi et al., is used (optionally) to enhance worm like structures possessing diverse widths and length scales (see FIG. 7B, ii).

The contrasted image is then binarized based on an adaptive threshold calculated based on local first order statistic and image size (see FIG. 7B, iii) by the thresholding function so that objects are assigned a value of 1 while the background is assigned 0. Additionally, the user is provided options for morphological dilation/erosion of the objects and the ability to impose a raw cutoff on the minimum and maximum object size (total number of pixels that compose an object) without regards to the morphology of the object. The user is provided a visual readout in the GUI to validate outputs of the image cleaning function and the thresholding function.

Figure 7B:
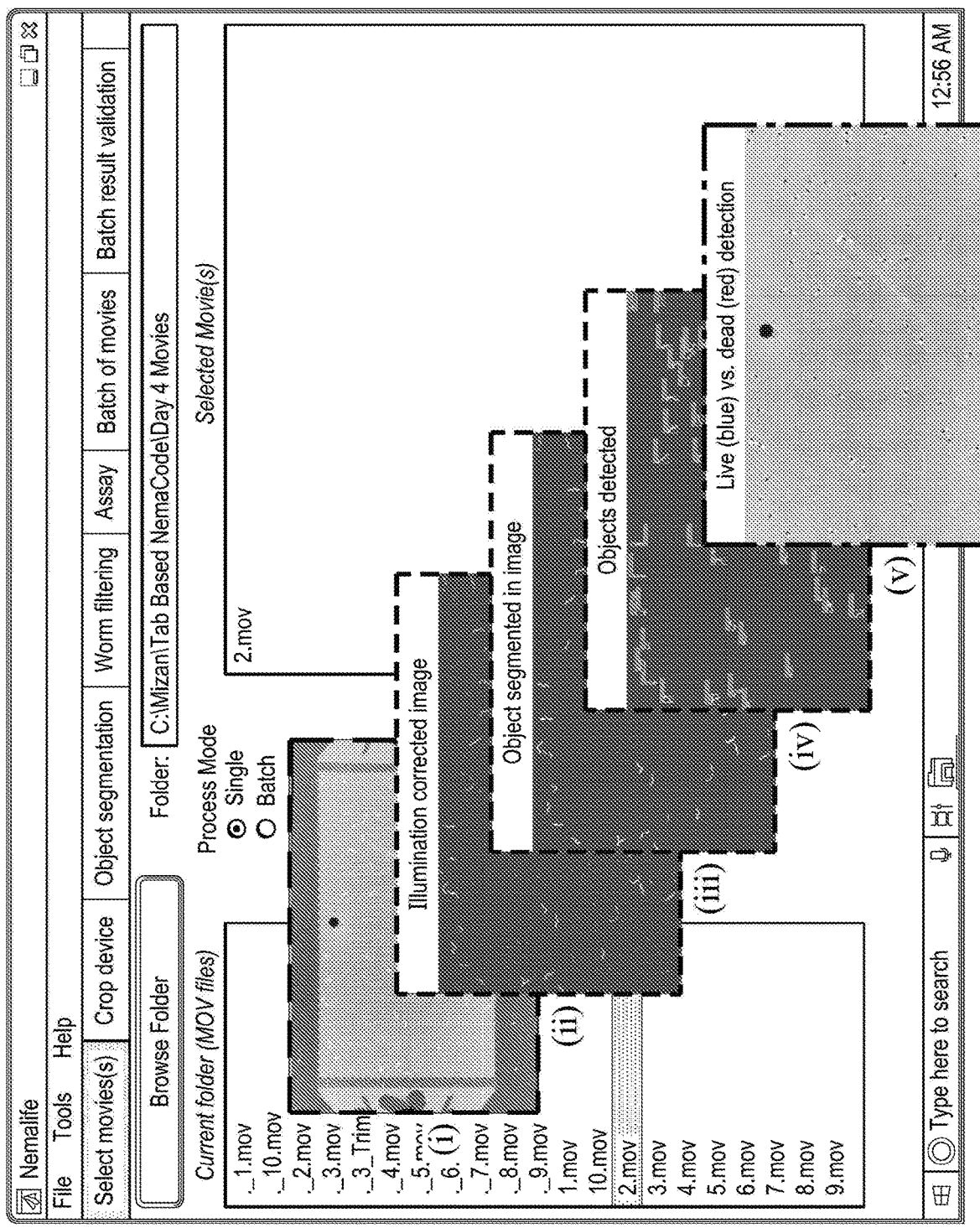

In step (3), the morphology of object regions is accounted for filtering worms from other objects that could not be separated based on intensity-based approaches in step (2). The regionprops function of MATLAB is used within the object properties function to estimate length (head to tail distance in pixels), area (total pixels), width (area/perimeter) and solidity (area/(convex area)) as object metrics (FIG. 7B, iv). The metrics from the object properties function are used to establish min and max value filtering constraints to filter worms from other objects. The user is provided visual readout in the GUI to validate outputs of step (3) by graphing the various worm metrics and showing annotated images of the ROI (see FIG. 7B, iv). Step (3) thus provides an additional layer of separation to reduce false positives in worm detection by considering area, solidity, length and width metrics of the worm.

After final morphology-based detection in Step (3), live/dead calculation is performed in step (4) by estimating the degree of motion for each worm in two frames using the live dead counter function. First, the user chooses an appropriate number of frames to skip to arrive at consecutive frames 1 and 2 such that worm motion can be adequately captured and represented. Next, the location of the worm's body (coordinates of binarized object) as image region in frame 1 is used to evaluate change in the same image region (same coordinates) in frame 2. The change is calculated as $\Delta=\text{TotalPixels\_Region1\_Frame1}-\text{TotalPixels\_Region1\_Frame2}$. A sensitivity criterion in the form number_of_pixels is used to classify each worm as alive if change in pixels $\Delta>$number_of_pixels. The number of frames to skip and the sensitivity criterion depends on the acquisition frame rate and the image resolution. The live/dead calculation is repeated for each worm over all consecutive selected frames (with skip) to compute life and death statistics. The results are compiled in the form of a table that records framewise measure of worm size, body features and the live/dead decision. Additionally, the user is presented with graphs showing the number of worms alive, total number of worms and other statistics. A visual readout is also provided in the GUI for the user to scroll through the processed frames to visualize the results of the assay where, the worm movie is shown with blue and red markers overlaid on worm centroids to indicate live vs. dead states (FIG. 7B, v).

In step (5), locomotion computation is performed by tracking the worms. Worm tracking is done by skipping frames based on user input such that at least one worm length of motion is allowed in consecutive frames, say Frame 1 and Frame 2. A circular neighborhood (N) is then assigned around the centroid of each worm in Frame 1 such that the radius $R_n$ equals the maximum physiologically possible worm motion for the duration of the skipped frames. Next, worms in the neighborhood regions from Frame 1 are superposed on Frame 2 to locate worms contained in those regions in Frame 2. The worms found in Frame 2 via this juxtaposition are considered neighbors of worms from Frame 1. The pixel displacement of the centroids between the neighbors and the knowledge of video acquisition rate together with the skipped frame number, provides estimates of worm velocity. In case of conflict due to co-location of multiple neighbors, the inventors calculated a similarity index based on a least square type estimate of the worm shape metrics (from step (3)) between the parent worm from Frame 1 and possible neighbors in Frame 2. The lowest value of the similarity index is assumed to be the most similar and thus most probable neighbor. Locomotion computation of the worm is similarly realized over multiple frames to generate Lagrangian tracks.

These steps (1-5) together, thus integrate analytics, from preprocessing uploaded raw data to life to locomotion estimation, as a seamless scalable process. In the implementation of the analytics algorithms the inventors have enabled a sequential processing version for single movies as well as a parallel processing version which is capable of processing multiple movies for high throughput.

Figure 8A:
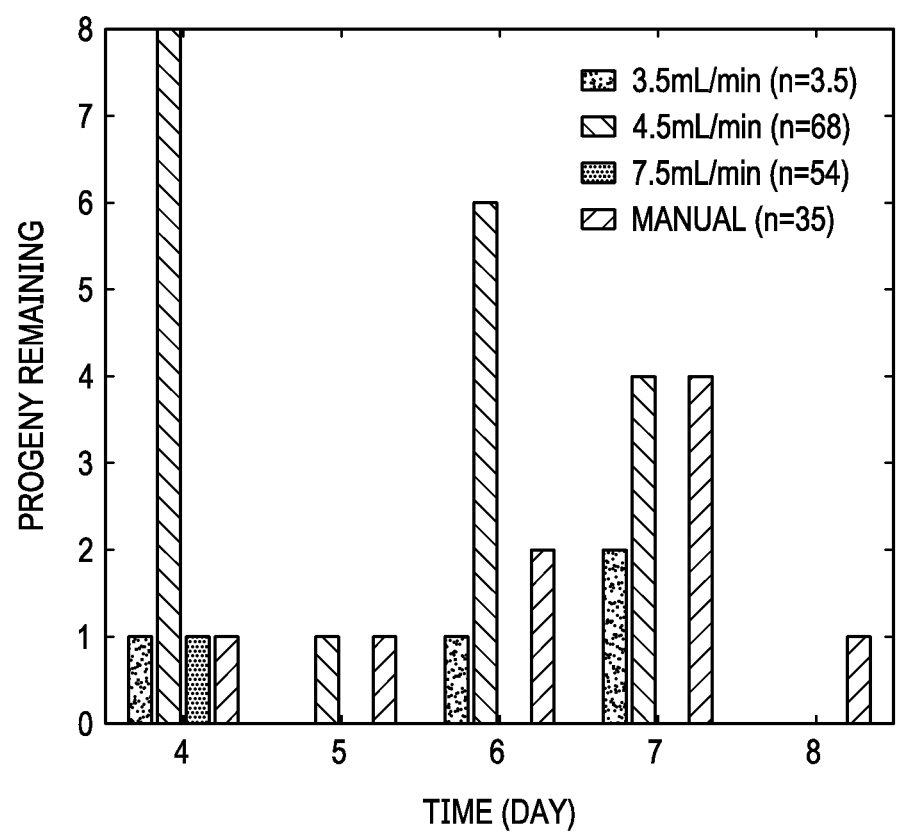
FIGS. 8A to 8E optimization of parameters for NemaLife Machine protocol.
Figure 8B:
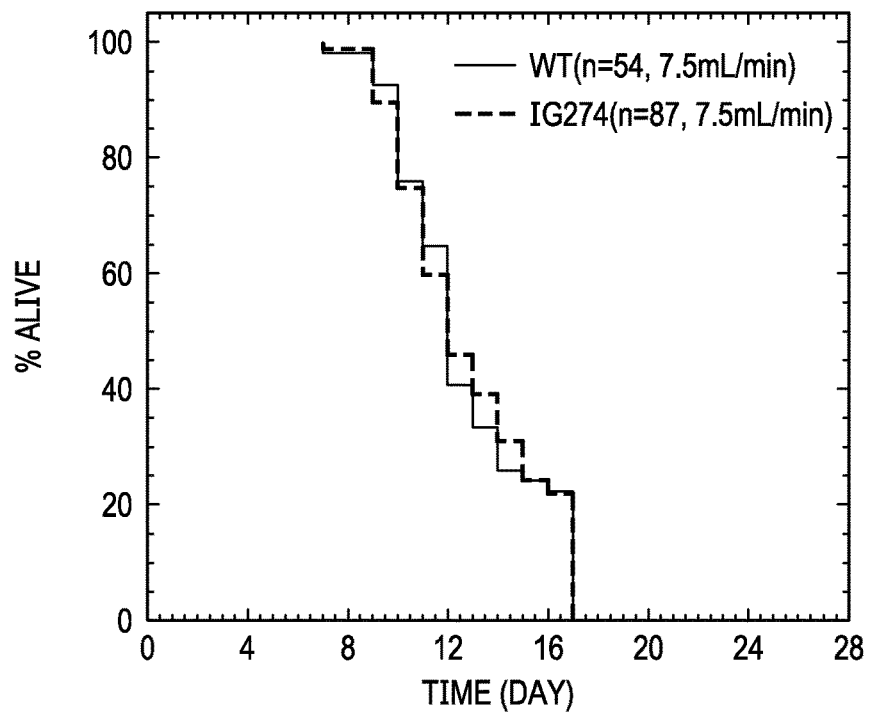

The inventors initially assessed the optimal flow rates of the pumps to wash the progeny from the microfluidic devices. The inventors tested flow rates of 3.5, 4.5 and 7.5 mL/min per chip for a wash duration of 90 seconds. Results shown in FIG. 8A indicate that 7.5 mL/min is the optimal flow rate for removing progeny. The inventors also evaluated whether this flow rate causes cuticle damage in the worm by using the strain IG 274 that has a reporter nlp-29p::GFP in the epidermis. As shown in FIG. 8B, the inventors did not observe any difference in the lifespan of this strain compared to wildtype, indicating that the flow rate of 7.5 mL/hr does not cause cuticle damage.

Figure 8C:
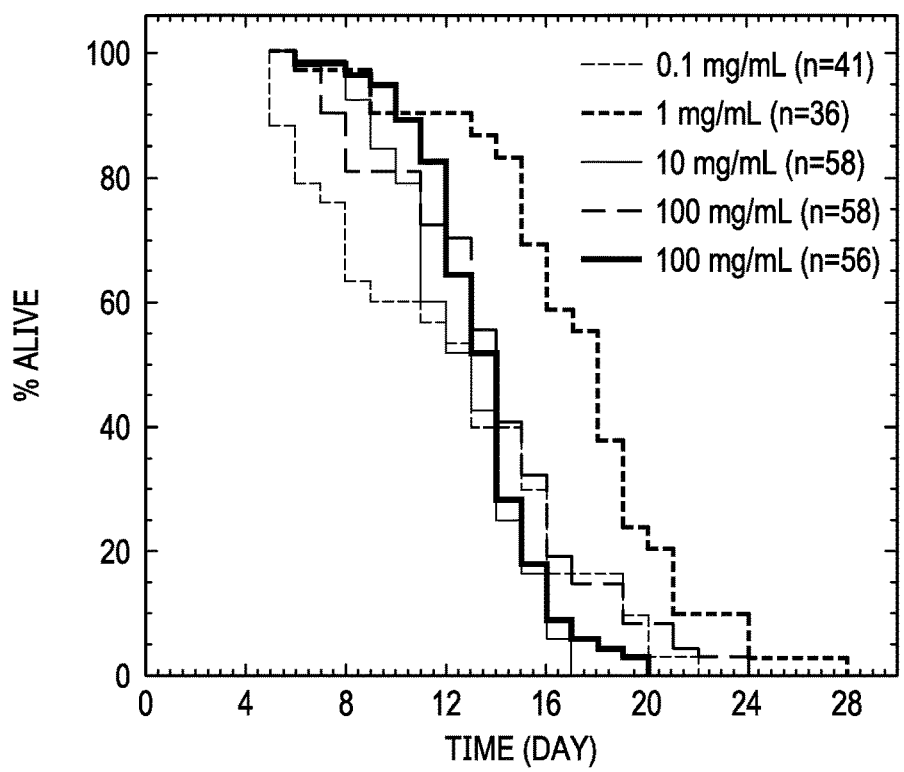
Figure 8D:
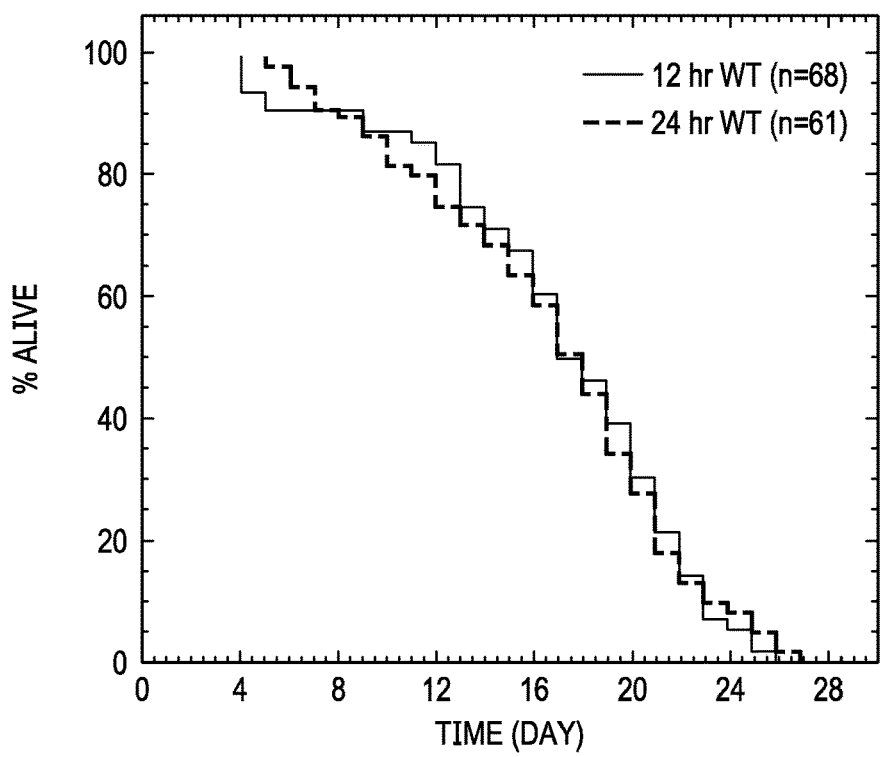
Figure 8E:
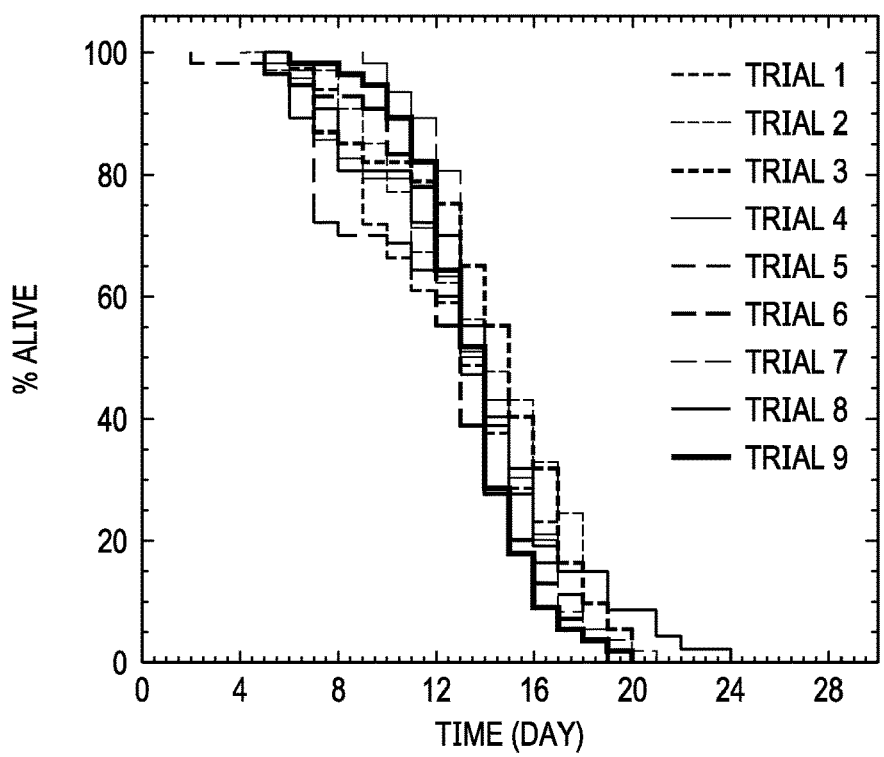

Next, the inventors varied the feeding doses from 0.1-100 mg/mL per day. The lifespan curves shown in FIG. 8C indicate that 0.1 mg/mL is too low for animal survival, where 1 mg/mL provides lifespan extension. However, 10-100 mg/mL yield similar lifespan data. Thus, a food dosing of 10-100 mg/mL is an optimal food concentration for achieving lifespan data in *C. elegans*. The inventors also tested whether the feeding frequency makes a difference. Feeding at 100 mg/mL once a day or twice/day did not make any difference in the lifespan curves as shown in FIG. 8D. In FIG. 8E, the inventors show reproducibility in the lifespan curve by superimposing data sets from nine independent trials. The inventors found the variation in median and maximum lifespan is 5.3% and 7.4% respectively.

Figure 9:
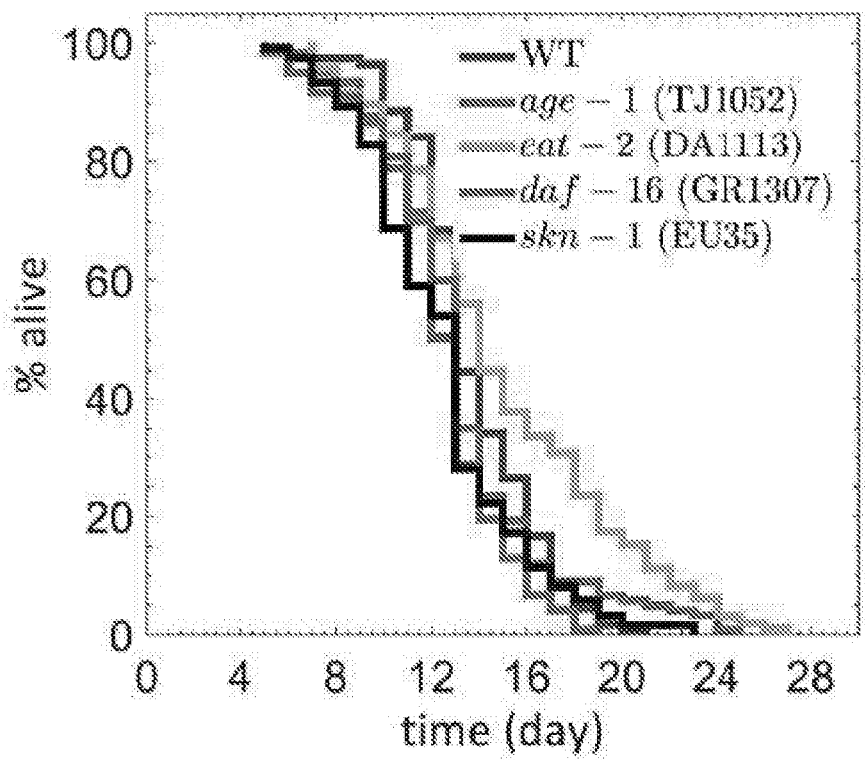
FIG. 9 shows an evaluation of lifespan of mutants in the NemaLife Machine. Lifespan of mutants age-1 (TJ1052), eat-2 (DA1113), daf-16 (GR1307), and skn-1 (EU35) compared to wild-type (N2 isolate). N=113 for wild-type, 122 for age-1, 97 for eat-2, 119 for daf-16, and 121 for skn-1. The table below shows the median and maximum lifespan for each of the strain studied.

To further test the overall system, the inventors ran mutants that have been well characterized in terms of their longevity (FIG. 9). The inventors found that as expected age-1, eat-2 and skn-1 show extended lifespan and daf-16 shows diminished lifespan.

Figure 10A:
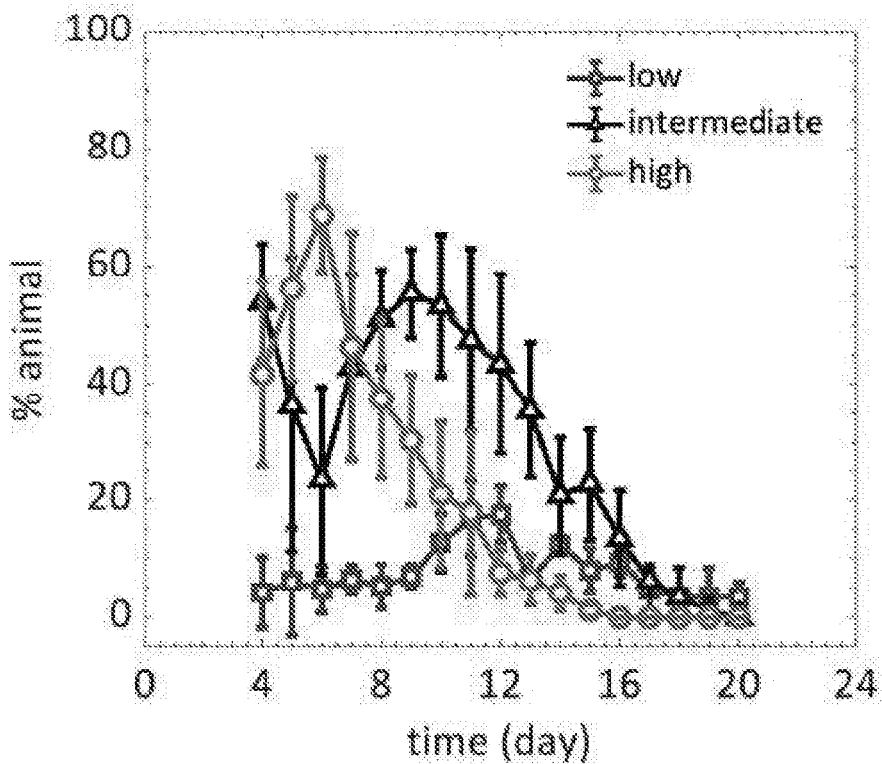
FIGS. 10A to 10C show a healthspan evaluation of wild-type *C. elegans* cultured in NemaLife. Animals grouped into cohorts with high, intermediate and low mobility by tracking animals in a 90 second video. Data is shown for video segments of (FIG. 10A) 0-10 s (FIG. 10B) 50-60 s and (FIG. 10C) 80-90 s.
Figure 10B:
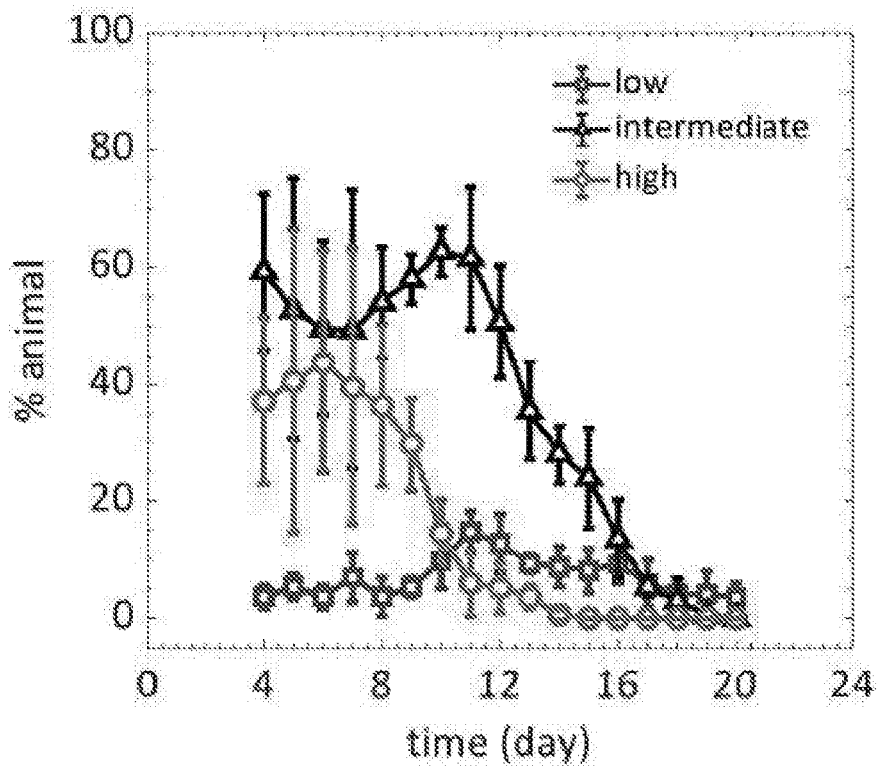
Figure 10:
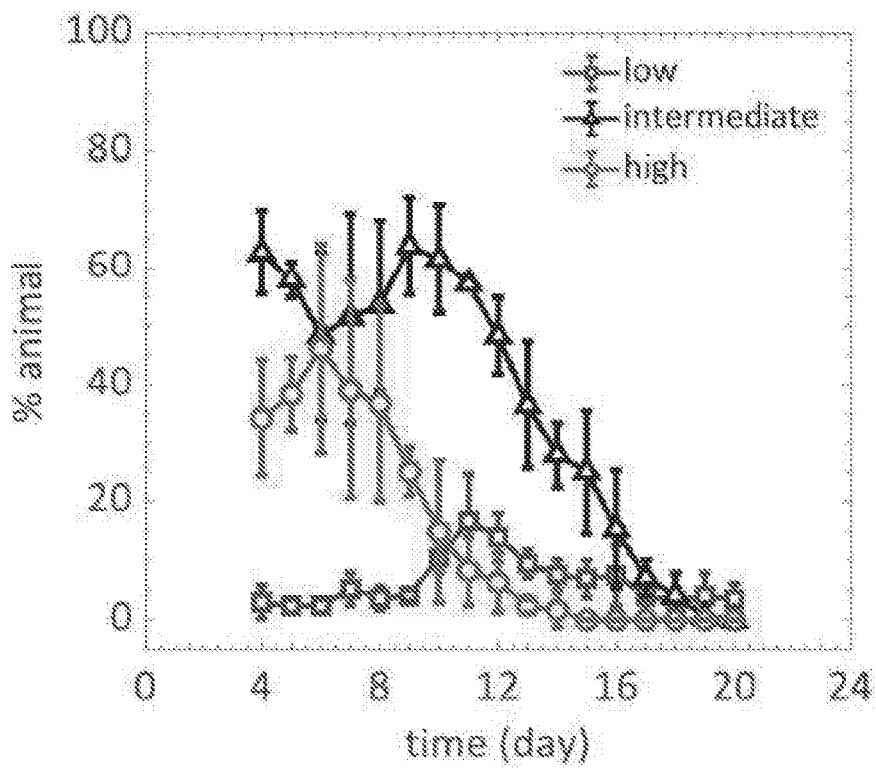

Healthspan evaluation. The video-recording of the animals in the micropillar arena with the iPod provides the ability to evaluate the healthspan of the animals using locomotory and reproductive measures. The inventors tracked the locomotion of wild-type animals and grouped them into cohorts with high, intermediate and low mobility (FIGS. 10A to 10C). Animals that moved more than a body length in 10 seconds were classified as high mobility worms, while those that moved less than a body length in 10 seconds as intermediate mobility. Animals that barely moved in 10 seconds were labeled as belonging to the low mobility cohort. The inventors performed this cohort analysis by tracking the motion in the first 0-10 s, 50-60 s and 80-90 s of the acquired videos. The inventors observed that the fraction of animals showing high and intermediate mobility declines with age. The onset of mobility decline is rapid after 7 days.

Figure 11:
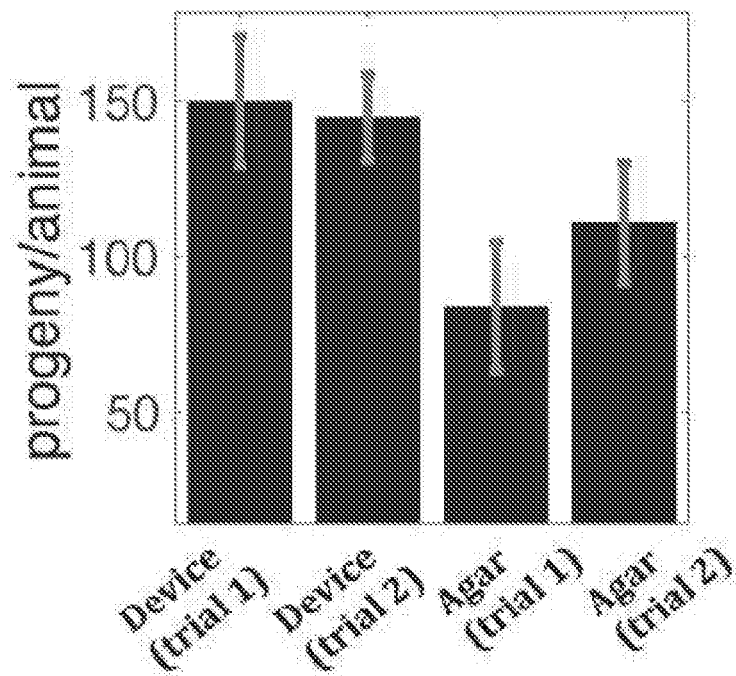
FIG. 11 shows a determining progeny production of animals cultured in the NemaLife Machine. Progeny were counted by collecting the washed fluid over a period of four days in two devices, and compared with data from animals reared on agar-plates.

A unique feature of the NemaLife Machine is that it allows collection of fluid from the nematode arena during the washing step. As a result, progeny can be collected and used to evaluate the reproductive fitness across life with different strains. The inventors collected the washed fluid and counted the number of progeny per animal. Data in FIG. 11, shows that the progeny counts from animals reared in the NemaLife Machine are higher than those reared on standard agar-plates. This result indicates that animals are healthy in the microfluidic device environment, and that the washed fluid can be collected to determine reproductive capacity for a population of animals.

The inventors successfully demonstrated that *C. elegans* can be effectively maintained in the NemaLife microfluidic device across its lifespan without using chemicals (progeny-blocking drugs, antibacterial agents, antifungal compounds, etc.) in an environment that recapitulates longevity on agar plates. Micropillars in the microfluidic device enable the animals to maintain natural crawling gaits and eliminate stresses like swim-induced fatigue. Both individual and a population of crawling animals can be studied across life. The key benefits of the NemaLife Machine are:

Lifelong culture without animal transfers
Plate-like animal behavior with no swim-stress
Automated scoring of animal activity and survival
Throughput: 24 assays/hour/user/machine
Collect progeny for downstream assays
Video-archiving for retrospective analysis The above benefits offered by the NemaLife Machine will be of tremendous importance in a broad range of applications including drug screening, toxicology testing, genetic screens, behavioral phenotyping and disease investigations.

Worm culture. All animals were cultured on 60 mm petri dishes containing nematode growth medium (NGM) at 20° C. before loading into the microfluidic chamber. The NGM filled petri dishes were seeded with 300-400 μL of bacteria *Escherichia coli* OP50 and incubated for 48 hours at 20° C. For age synchronization, 20-25 gravid adults were placed on seeded plates to lay eggs for 3-4 hours. After eggs were laid, the animals were removed from the plates and the plates with eggs were incubated for 60-72 hours. The day the eggs were laid was scored as day 0.

Microfluidic device fabrication and preparation. All microfluidic devices were fabricated in poly(dimethyl)siloxane (PDMS) using soft lithography[44]. A mold was fabricated using SU-8 photolithography such that the chamber height is ≈100 μm and the micropillar height is ≈75 μm, as described previously[45]. A 4-6 mm thick PDMS (Sylgard 184 A and B, 1:10 by weight, Dow Corning) layer was casted on to the mold and the inlet/outlet holes were punched with a 1 mm hole puncher. The PDMS device was then bonded on a glass surface irreversibly and rendered hydrophilic by plasma treatment (Harrick Plasma Inc.). Before using the device for lifespan/healthspan experiments, the device interiors were filled with 70% ethanol for 5 minutes to sterilize them. Subsequently, the device was rinsed 4-5 times with Liquid NGM solution. Devices were then treated with 5 wt % Pluronic F127 (Sigma-Aldrich) for 30 minutes to prevent protein and bacterial build-up[33]. In addition, Pluronic treatment also assists with removal of any trapped air bubbles. After incubation, excess Pluronic was removed by washing with Liquid NGM. The Pluronic-treated devices were stored in moist petri dishes at 20° C. for immediate use or at 4° C. for future use.

Food preparation. *E. coli* OP50 was used as the bacterial food source for worms grown on both NGM and maintained within the devices. Bacterial suspension of 100 mg/mL in Liquid NGM solution corresponding to ≈$10^9$ bacteria/mL was used for lifespan assays unless otherwise noted. *E. coli* OP50 was grown overnight at 37° C. in standard LB broth. Bacterial suspensions of 100 mg/mL were prepared by centrifuging 500 mL of overnight bacterial culture and resuspending the pellet in Liquid NGM. Concentrated OP50 was stored at 4° C. for subsequent use, up to 1 week.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

1 Harman, D. The aging process: Major risk factor for disease and death. Proceedings of National Academy of Science 88, 5360-5363 (1991).
2 Niccoli, T. & Partridge, L. Ageing as a Risk Factor for Disease. Current Biology 22, R741-R752, doi:10.1016/j.cub.2012.07.024 (2012).
3 Farooqui, T. & Farooqui, A. A. Aging: An important factor for the pathogenesis of neurodegenerative diseases. Mechanisms of aging and development 130, 203-215 (2009).
4 North, B. J. & Sinclair, D. A. The intersection between aging and cardiovascular disease. Circulation research 110, 1097-1108 (2012).
5 White, M. C. et al. Age and cancer risk: a potentially modifiable relationship. American journal of preventive medicine 46, S7-15 (2014).
6 Shaye, D. & Greenwald, I. OrthoList: A Compendium of *C. elegans* Genes with Human Orthologs. Plos One 6, doi:10.1371/journal.pone.0020085 (2011).
7 Kenyon, C. J. The genetics of ageing. Nature 464, 504-512 (2010).
8 Consortium, C. e. S. & Consortium, C. e. S. Genome sequence of the nematode C-elegans: A platform for investigating biology. Science 282, 2012-2018, doi: 10.1093/glycob/cwi075 (1998).
9 Kenyon, C. The plasticity of aging: Insights from long-lived mutants. Cell 120, 449-460, doi:10.1016/j.cell.2005.02.002110.1016/j.cell.2006.02.002 (2005).
10 Fielenbach, N. & Antebi, A. C-elegans dauer formation and the molecular basis of plasticity. Genes & Development 22, 2149-2165, doi:10.1101/gad.1701508 (2008).
11 Chalfie, M., Tu, Y., Euskirchen, G., Ward, W. W. & Prasher, D. C. Green fluorescent protein as a marker for gene-expression. Science 263, 802-805 (1994).
12 Ran, F. et al. Genome engineering using the CRISPR-Cas9 system. Nature Protocols 8, 2281-2308, doi: 10.1038/nprot.2013.143 (2013).
13 Fire, A. et al. Potent and specific genetic interference by double-stranded RNA in *Caenorhabditis elegans*. Nature 391, 806-811, doi:10.1038/35888 (1998).
14 Mitchell, D. H., Stiles, J. W., Santelli, J. & Sanadi, D. R. Synchronous growth and aging of *Caenorhabditis elegans* in the presence of Fluorodeoxyuridine. The Journal of gerontology 34, 28-36 (1979).
15 Gandhi, S., Santelli, J., Mitchell, D. H., Stiles, J. W. & Sanadi, D. R. A simple method for maintaining large, aging populations of *Caenorhabditis elegans*. Mechanisms of aging and development 12, 137-150 (1980).
16 Bishop, N. & Guarente, L. Two neurons mediate diet-restriction-induced longevity in C-elegans. Nature 447, 545-+(2007).
17 Vanvoorhies, W. Production of sperm reduces nematode life-span. Nature 360, 456-458, doi:10.1038/360456a0 (1992).
18 Zhang, W. B. et al. Extended twilight among isogenic *C. elegans* causes a disproportionate scaling between lifespan and health. Cell Systems 3, 333-345 (2016).
19 Pittman, W., Sinha, D., Zhang, W., Kinser, H. & Pincus, Z. A simple culture system for long-term imaging of individual *C. elegans*. Lab on a Chip 17, 3909-3920, doi:10.1039/c71c00916j (2017).
20 Stroustrup, N. et al. The *Caenorhabditis elegans* Lifespan Machine. Nature Methods 10, 665-+(2013).

21 Stroustrup, N. et al. The temporal scaling of *Caenorhabditis elegans* ageing. Nature 530, 103-+, doi:10.1038/nature16550 (2016).
22 Lucanic, M., Plummer, W. T., Lithgow, G. J., Driscoll, M. & Phillips, P. C. Impact of genetic background and experimental reproducibility on identifying chemical compounds with robust longevity effects. Nature communication 8, 14256 (2017).
23 Churgin, M. A. et al. Longitudinal imaging of *Caenorhabditis elegans* in a microfabricated device reveals variation in behavioral decline during aging. eLife 10 (2017).
24 Anderson, E. et al. C-elegans lifespan extension by osmotic stress requires FUdR, base excision repair, FOXO, and sirtuins. Mechanisms of Ageing and Development 154, 30-42 (2016).
25 Angeli, S. et al. A DNA synthesis inhibitor is protective against proteotoxic stressors via modulation of fertility pathways in *Caenorhabditis elegans*. Aging-Us 5, 759-769, doi:10.18632/aging.100605 (2013).
26 Aitlhadj, L. & Sturzenbaum, S. The use of FUdR can cause prolonged longevity in mutant nematodes. Mechanisms of Ageing and Development 131, 364-365 (2010).
27 Van Raamsdonk, J. & Hekimi, S. FUdR causes a twofold increase in the lifespan of the mitochondrial mutant gas-1. Mechanisms of Ageing and Development 132, 519-521 (2011).
28 Greer, E. & Brunet, A. Different dietary restriction regimens extend lifespan by both independent and overlapping genetic pathways in C-elegans. Aging Cell 8, 113-127 (2009).
29 Kauffman, A. L., Ashraf, J. M., Corces-Zimmerman, M. R., Landis, J. N. & Murphy, C. T. Insulin signaling and dietary restriction differentially influence the decline of learning and memory with age. PLos Biology 8, e1000372 (2010).
30 Hulme, S. et al. Lifespan-on-a-chip: microfluidic chambers for performing lifelong observation of *C. elegans*. Lab on a Chip 10, 589-597, doi:10.1039/b919265d (2010).
31 Wen, H., Shi, W. & Qin, J. Multiparameter evaluation of the longevity in C-elegans under stress using an integrated microfluidic device. Biomedical Microdevices 14, 721-728 (2012).
32 Wen, H., Yu, Y., Zhu, G., Jiang, L. & Qin, J. A droplet microchip with substance exchange capability for the developmental study of C-elegans. Lab on a Chip 15, 1905-1911 (2015).
33 Xian, B. et al. WormFarm: a quantitative control and measurement device toward automated *Caenorhabditis elegans* aging analysis. Aging Cell 12, 398-409 (2013).
34 Dong, L., Cornaglia, M., Lehnert, T. & Gijs, M. On-chip microfluidic biocommunication assay for studying male-induced demise in *C. elegans* hermaphrodites. Lab on a Chip 16, 4534-4545, doi:10.1039/c6lc01005a (2016).
35 Halldorsson, S., Lucumi, E., Gomez-Sjoberg, R. & Fleming, R. Advantages and challenges of microfluidic cell culture in polydimethylsiloxane devices. Biosensors & Bioelectronics 63, 218-231, doi:10.1016/j.bios.2014.07.029 (2015).
36 Chung, K. et al. Microfluidic chamber arrays for whole-organism behavior-based chemical screening. Lab on a Chip 11, 3689-3697, doi:10.1039/c1lc20400a (2011).
37 Letizia, M. et al. Microfluidic-enabled phenotyping of a whole population of *C. elegans* worms over their embryonic and post-embryonic development at single-organism resolution. Microsystems & Nanoengineering 4 (2018).
38 Szewczyk, N. et al. Delayed development and lifespan extension as features of metabolic lifestyle alteration in C-elegans under dietary restriction. Journal of Experimental Biology 209, 4129-4139, doi:10.1242/jeb.02492 (2006).
39 Laranjeiro, R., Harinath, G., Burke, D., Braeckman, B. P. & Driscoll, M. Single swim sessions in *C. elegans* induce key features of mammalian exercises. BioMed Central Biology 15, doi:10.1186/s12915-017-0368-4 (2017).
40 Chuang, H., Kuo, W., Lee, C., Chu, I. & Chen, C. Exercise in an electrotactic flow chamber ameliorates age-related degeneration in *Caenorhabditis elegans*. Scientific Reports 6, doi:10.1038/srep28064 (2016).
41 Hartman, J. et al. Swimming Exercise and Transient Food Deprivation in *Caenorhabditis elegans* Promote Mitochondrial Maintenance and Protect Against Chemical-Induced Mitotoxicity. Scientific Reports 8, doi:10.1038/s41598-018-26552-9 (2018).
42 Albrecht, D. & Bargmann, C. High-content behavioral analysis of *Caenorhabditis elegans* in precise spatiotemporal chemical environments. Nature Methods 8, 599-605 (2011).
43 Ai, X., Zhuo, W., Liang, Q., McGrath, P. & Lu, H. A high-throughput device for size based separation of C-elegans developmental stages. Lab on a Chip 14, 1746-1752, doi:10.1039/c3lc51334c (2014).
44 McDonald, J. C. et al. Fabrication of microfluidic systems in poly(dimethylsiloxane). Electrophoresis 21, 27-40 (2000).
45 Rahman, M. et al. NemaFlex: A microfluidics-based technology for measurement of muscular strength of *C. elegans*. Lab on a chip 18, 2187-2201, doi:DOI: 10.1039/c8lc00103k (2018).

What is claimed is:

1. A system for analyzing animals comprising:
a media reservoir and a media pump in fluid communication with the media reservoir; a food reservoir and a food pump in fluid communication with the food reservoir;
an input port in fluid communication with the media pump and the food pump; a microfluidic device in fluid communication with the input port comprising:
(1) a micropillar arena for containment of the animals, wherein the micropillar arena comprises a plurality of micropillars to permit the animals to crawl within it, the microfluidic device further comprises a first plurality of sieve channels between the input port and the micropillar arena, and a second plurality of sieve channels between the micropillar arena and the output port, wherein the first and second plurality of sieve channels configured to permit the passage of multicellular progeny and eggs, but not adult animals; and
(2) a plurality of micropillar chambers, wherein each micropillar chamber is configured to permit a single animal to crawl within it; and
a transparent outer surface for at least illumination or imaging; and an outlet port in fluid communication with the microfluidic device;
a light source positioned outside the micropillar arena to illuminate an interior of the micropillar arena;
an imager positioned outside the micropillar arena to image the interior of the micropillar arena; and
a controller coupled to the media pump, the food pump, the microfluidic device, the light source, and the imager.

2. The system of claim 1, wherein the microfluidic device comprises: an input flow distribution area in fluid communication with the input port; the micropillar arena in fluid communication with the input flow distribution area, wherein the plurality of micropillars is distributed in a pattern configured to permit the animals to crawl in spaces between the micropillars and to permit retaining adult animals while removing progeny animals; and an outlet flow distribution area in fluid communication with the micropillar arena in fluid communication with the outlet port; or optionally a distribution channel for introduction of the animals, comprising an inlet end and an outlet end, with the inlet end in fluid communication with the input port and with the outlet end in fluid communication with the outlet port; wherein the plurality of micropillar chambers is distributed along the distribution channel and in fluid communication with it, each micropillar chamber comprising a tapered neck for size-based selection and entrapment of a single animal in each micropillar chamber with a sufficiently high fluid flow rate.

3. The system of claim 2, wherein each of the micropillars has a circular, oval, square, rectangular, or other polygonal cross-section, or a cross-section comprising some combination of those shapes.

4. The system of claim 1, further comprising analyzing at least one of recording motion of the animals, counting live and dead animals, studying behavior of the animals, or studying mobility of the animals.

5. The system of claim 1, wherein the animals are nematodes of at least the genus *Caenorhabditis*.

6. The system of claim 1, wherein the light source comprises a light-emitting diode and the imager is a digital imager.

* * * * *